United States Patent [19]

Miller et al.

[11] Patent Number: 5,465,011

[45] Date of Patent: Nov. 7, 1995

[54] UNINTERRUPTIBLE POWER SUPPLY WITH IMPROVED OUTPUT REGULATION

[75] Inventors: Frank D. Miller, Moorpark; Thomas E. Helfrich, Santa Ana, both of Calif.

[73] Assignee: Square D Company, Palatine, Ill.

[21] Appl. No.: 990,566

[22] Filed: Dec. 14, 1992

[51] Int. Cl.$^6$ .............................. H02J 7/00; H02M 7/00
[52] U.S. Cl. ............................................. 307/64; 363/34
[58] Field of Search ............................ 307/64–66, 87, 307/86, 85; 363/34, 37; 364/492

[56] References Cited

U.S. PATENT DOCUMENTS

| | | | |
|---|---|---|---|
| 4,916,329 | 4/1990 | Dang et al. | 307/66 |
| 5,289,046 | 2/1994 | Gregorich | 307/66 |
| 5,315,533 | 5/1994 | Stich et al. | 307/66 |

Primary Examiner—William M. Shoop, Jr.
Assistant Examiner—Jonathan S. Kaplan
Attorney, Agent, or Firm—Michael J. Femal; Richard J. Graefe; Larry I. Golden

[57] ABSTRACT

A microprocessor based uninterruptible power supply generates an AC electrical output power from an AC input source when the AC input source is within settable voltage limits and from an auxiliary source of DC power when the AC input source is outside said the voltage limits. The microprocessor provides monitoring of the AC input voltage to determine its amplitude and frequency, and uses this information to set the magnitude and frequency of the AC output voltage and to select the source of the AC output power. A power factor improvement circuit boosts the selected source to a high DC voltage which is inverted by a chopper circuit to produce a high frequency AC voltage is rectified and sent to a PWM inverter to produce the AC output power. An average current feedback loop provides the output voltage regulation and utilizes current limiting to provide output current limiting for protection against short circuits and overloads. A voltage phase relationship is maintained between the AC input power and AC output power to eliminate voltage and current transients at transfer times between the AC and DC input sources. A serial data communications port sends data sent over a network that includes signals indicative of the status of the uninterruptible power supply and receives data from the network for controlling operation of the uninterruptible power supply.

21 Claims, 24 Drawing Sheets

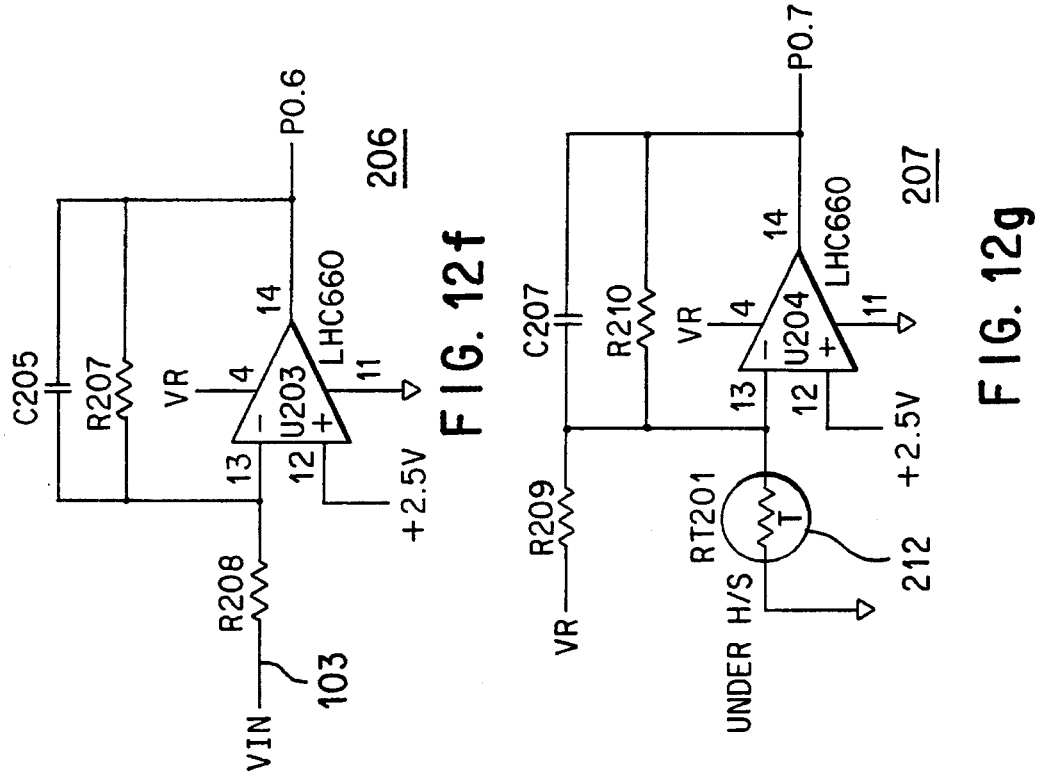
FIG. 12f
FIG. 12g
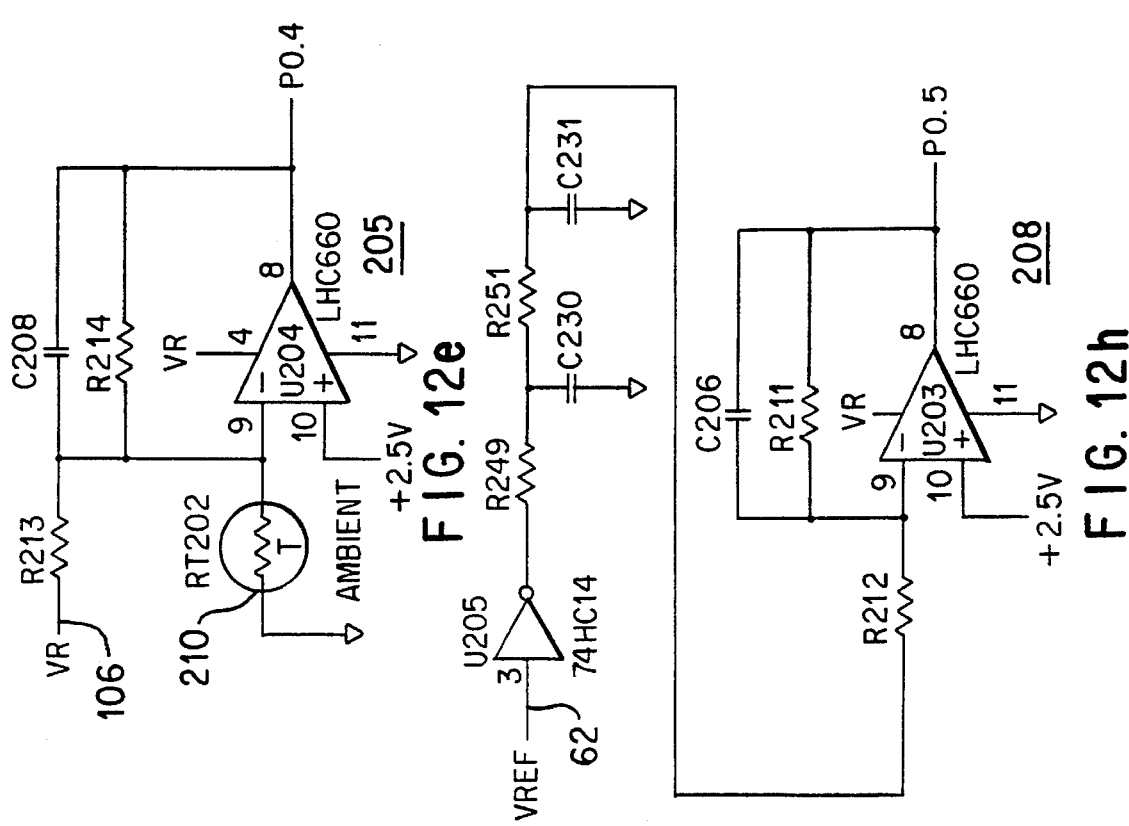
FIG. 12e
FIG. 12h

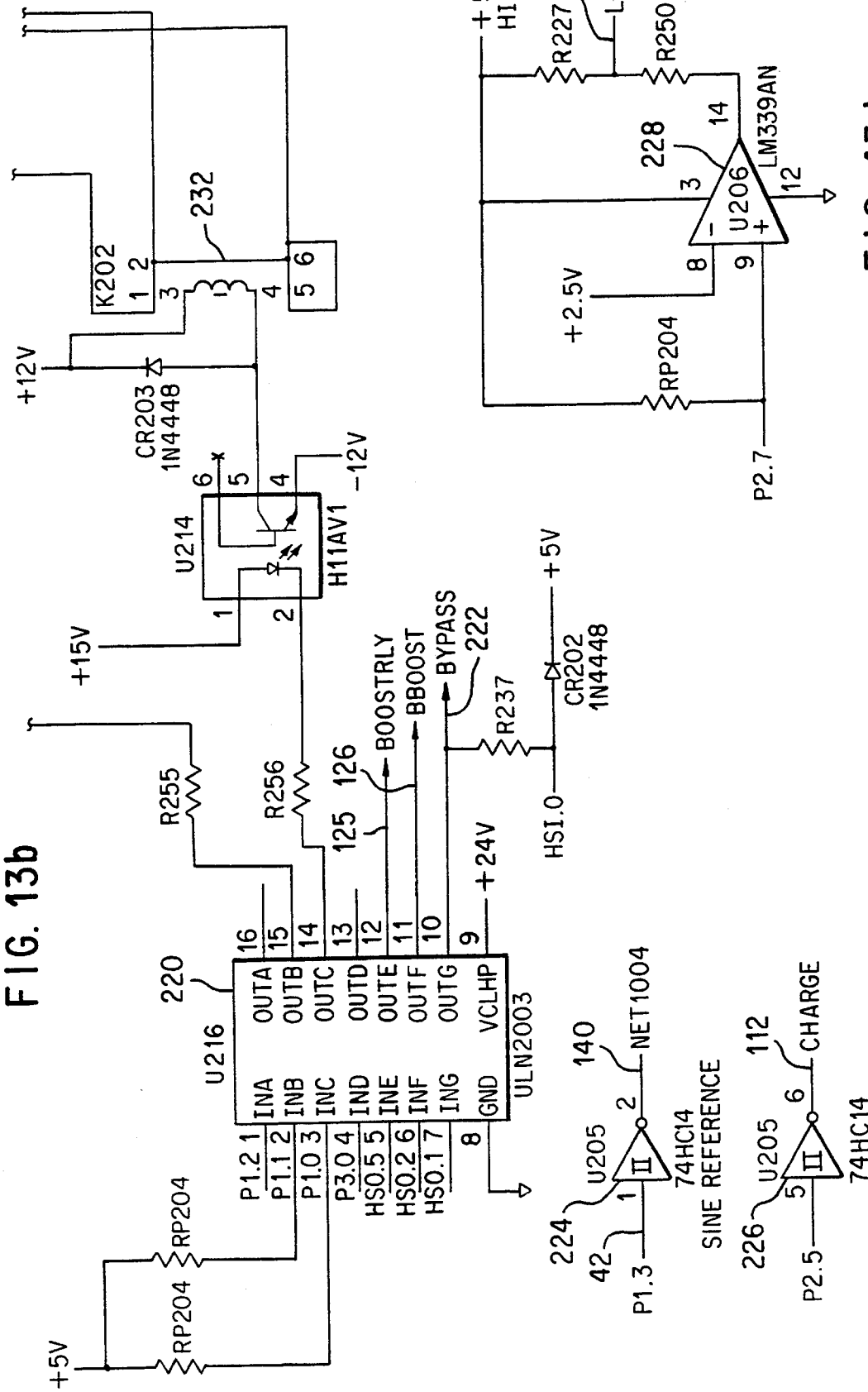

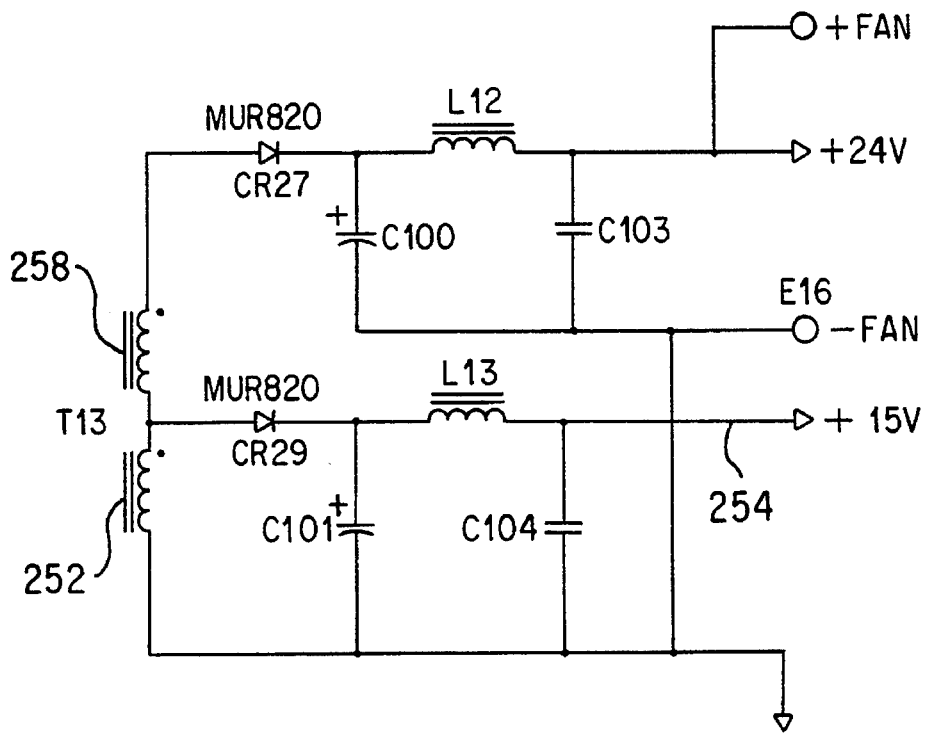
F I G. 14b
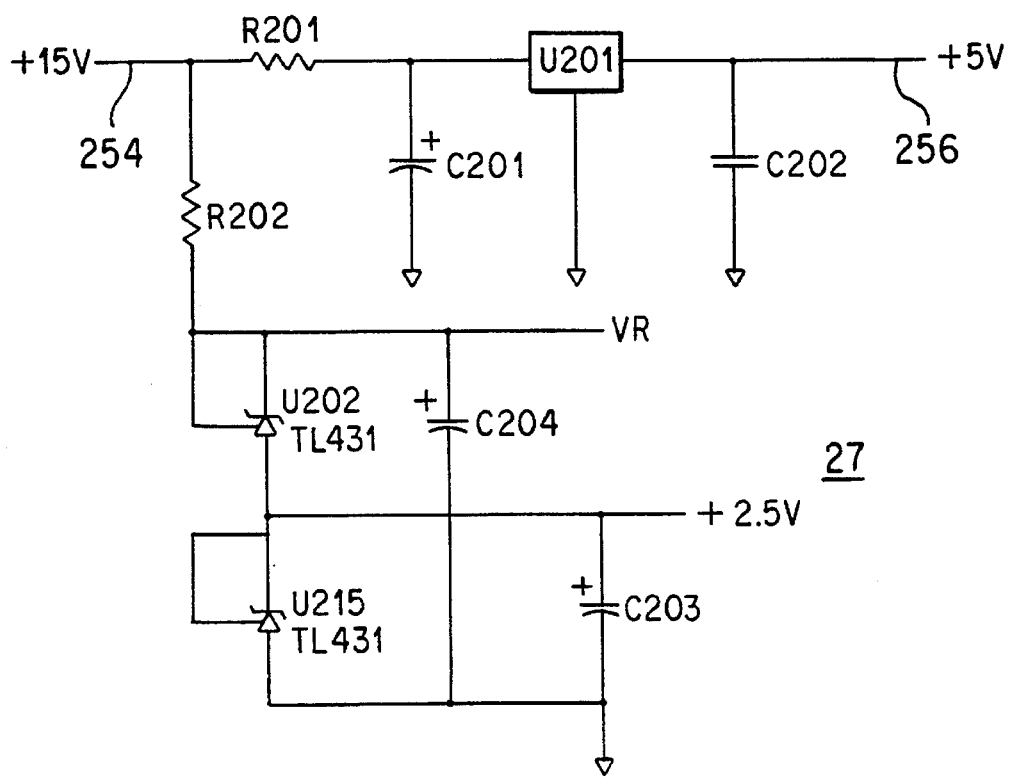
F I G. 14c

UNINTERRUPTIBLE POWER SUPPLY WITH IMPROVED OUTPUT REGULATION

TECHNICAL FIELD

Applicants' invention relates generally to power supply devices for supplying backup AC input power to loads or other devices connected to interruptible utility or other generation power sources. More particularly, it relates to a microprocessor based uninterruptible power supply or UPS system that supplies standby electrical power to such loads either upon a loss or a variation of the AC input power.

RELATED APPLICATIONS

This application is related to the following, commonly assigned applications filed concurrently herewith, entitled "Average Current Mode Control Apparatus For An AC Output Amplifier" U.S. Pat. No. 5,371,666 filed Dec. 4, 1992; and "Method of Phase Synchronization Between Two AC Signals" (Ser. No. 07/989,689 filed Dec. 14, 1992). The contents of these applications are expressly incorporated herein by reference.

BACKGROUND ART

The use of electronic and computer systems has expanded immensely and affects almost all ways of life. Even brief interruptions of or variations in the input power source can cause failures to these systems, resulting in lost time, data, damaged equipment, and high repair bills. To overcome these problems, UPS systems have been developed and are well known in the art. These include both on-line and off-line configurations. The simplest type, single conversion or standby, uses a battery, an inverter to convert the battery voltage to an AC output voltage, and a transfer switch that connects the AC output voltage if the source voltage is lost. The transfer time during the switching can be noticeable and can become significant in some computer applications. Double conversion or on-line types eliminate this transfer time. The AC source voltage is continuously converted by a rectifier to a DC voltage and charges a battery that is in parallel with the DC voltage. This DC voltage is converted by an inverter back to an AC output voltage. If the AC source voltage is lost, the battery supplies the DC voltage to the inverter immediately and there is no interruption in power to the load. Upon the return of the AC source voltage, the load is again supplied from the AC source without any interruption in power. Since the incoming power is rectified, incoming power is inherently conditioned since surges, sags and noise can be essentially eliminated during the conversion to DC.

Many types of on-line UPS systems have been developed. Commonly assigned U.S. Pat. No. 4,916,329, describes one such device that uses a three port ferroresonant transformer having a first primary winding connected to an AC input, a second primary winding connected to a battery-inverter arrangement, and the secondary winding connected to the load. A series regulator in the first primary keeps the output voltage within certain limits when the AC input is present. The regulator also disconnects the AC line when the inverter supplies the output voltage. A synchronization circuit provides a means of having the AC output of the inverter in phase with the AC input when a transfer takes place to prevent large voltage transients.

Phase lock loops (PLL) have been commonly used as a means for locking one frequency to another to provide line synchronization and are commercially available as integrated circuit packages, such as a Harris Semiconductor type CD4046B. The possibility of a digital PLL and several algorithms are discussed in a master's thesis submitted by Thomas E. Helfrich to West Coast University and accepted on Apr. 11, 1991 entitled "Microcontroller Application In An Uninterruptible Power Supply". These algorithms are written in Basic and are not suitable for real time implementation. Compensation is required to eliminate observed frequency variations due to sampling times of the zero crossing detectors versus the actual zero crossings.

U.S. Pat. No. 4,719,550 describes another UPS system that is adaptable for use with alternate energy sources. This system requires an input source of given frequency and amplitude. A DC bus is established that is fed from either rectified AC input power or batteries. This is converted back to output AC voltage. Various configurations using different combinations of AC/DC, DC/AC, DC/DC and AC/AC converters are presented. Regulation of the AC output is controlled by keeping the DC bus at a predetermined energy level. Energy transfer into the bus is controlled by adjusting the magnitude and phase relationship of the AC input voltage and the AC side of an AC/DC converter feeding this bus.

These and other known types of UPS devices have various operational characteristics and features that are unique to the method employed and would be difficult to integrate into a single, cost effective device,. These include high efficiency in the normal mode of operation, small size, reliability of components, regulation of the AC output voltage during both on-line and standby modes of operation, fast transfer times between modes with low electrical noise generation, extended battery life, line isolation between source and load, synchronization of the input AC phase with the output inverter phase to eliminate possible voltage spikes to the load and the device during transfer times, and diagnostic capabilities. A microprocessor based UPS device could allow the integration of these features wherein the microprocessor eliminates the need for extensive hardware, with a reduction in power requirements, without compromising performance and increasing the overall efficiency of the UPS device.

Most output inverter stages employed in UPS systems compare the voltage output with a desired output in an error amplifier to produce an error signal proportional to the error. The error signal is then applied to the input of a pulse width modulator (PWM) operating at a frequency much higher than the output frequency. The width of the output pulse is modulated with respect to the error signal and applied to switching type amplifier. The output is filtered by an inductor to remove the high frequency components caused by the switching mode of operation. This may cause a problem in system frequency response and stability since the inductor introduces a pole in the system transfer function. To overcome this problem, an inner current feedback control loop is introduced to the voltage feedback to effectively eliminate the output inductor. These types of feedback systems utilized peak current mode control. This control requires slope compensation in the circuitry and requires compensation for peak to average current errors. To improve on this drawback, a current feedback system that relies on average current rather than peak current is desired. These types of control systems have been commonly developed for DC amplifiers but do not exist for AC systems.

Another problem commonly associated with prior art UPS systems is providing adequate protection for the solid state output devices to prevent failures due to overloads, short circuits and overheating.

Applicants' invention is provided to solve this integration problem and to provide other unique features that will become readily apparent.

SUMMARY OF THE INVENTION

Accordingly, the principal object of the present invention is to provide an on-line, microprocessor based uninterruptible power supply or UPS device which allows for the efficient transmission of AC input electrical power to a load during normal operation and continues to supply that load with standby electrical power when the source AC input power is lost or varies above or below established levels. The UPS device is insensitive to AC input frequency and determines the output voltage level on the basis of the sensed input frequency.

It is a further object of the invention to provide an UPS device that provides an improved phase synchronization of the AC input power source with the standby power source at the time of transfer between the AC power to standby power and vice versa.

A further objective of the invention is to provide an UPS device with improved AC output voltage regulation, including average current control having short circuit and overload protection.

It is still a further object of the invention to provide an UPS device that improves battery life by preventing overcharging, yet maintaining quick recovery capabilities.

Yet another object of the invention is to provide an UPS device having diagnostic capabilities and means for communicating the results of such diagnostics to other devices over a serial communications link.

In one embodiment of the invention, these objectives are met by employing a microprocessor (CPU) as the main control element to provide many control functions previously not possible or that require many external components that would result in prohibitive costs and extra space requirements. Inputs to the CPU provide monitoring of the AC source input voltage to determine frequency, either 50 or 60 Hz, and thus set the regulated output voltage level. The AC input voltage is converted to a DC voltage by a bridge rectifier, resulting in a first DC bus.

It is well known that rectifier circuits, followed by capacitor filters result in non-sinusodial current flow. The resultant power factor may be as low as 50 percent. Accordingly, a power factor correction circuit acting as a preregulator, along with a voltage boost circuit under control of the CPU, increases the power factor towards unity thereby greatly increasing the efficiency of the UPS device. This circuit increases the first DC voltage and maintains it at a second voltage level. This provides regulation of this bus under various input voltage fluctuations under both high and low line conditions. The added benefit is that the circuit allows for use on a wide variety of AC input voltages and frequencies. A first inverter circuit converts the second DC bus to an AC voltage, which is coupled to the primary of an isolation transformer. Dual secondary windings provide isolated AC outputs that are further rectified, resulting in two separate −200 VDC and +200 VDC buses. A second inverter circuit uses an average current mode regulation method to convert these two DC voltage buses to two separate AC output voltages.

A standby battery and associated control circuits supplies power to the first DC bus after a loss of or a large variation in the AC input voltage. The CPU monitors the input AC voltage to determine when a transfer should take place between the AC line and the battery to supply this bus either at the time of the loss or return of the AC line.

The CPU further samples the AC input and output voltages to provide phase synchronization of the two AC voltages at the times of transfer. This is accomplished by a program sequence that provides a real-time control PLL of the algorithms disclosed in the above mentioned master's thesis. Compensation is added to allow for measured versus actual voltage zero crossings to eliminated output frequency jitter.

The CPU further controls the charging of the batteries. In addition to monitoring the battery voltage, it also monitors the battery charge current. Using these parameters, it allows the batteries to be charged at a rapid rate at the beginning of the charging cycle and at a reduced rate near the end of the cycle. This provides the batteries with a float charge when they are fully charged and prevents overcharging.

Other features and advantages of the invention will be apparent from the following specification taken in conjunction with the accompanying drawings in which there is shown a preferred embodiment of the invention. Reference is made to the claims for interpreting the full scope of the invention which is not necessarily represented by such embodiment.

BRIEF DESCRIPTION OF DRAWINGS

FIGS. 1 and 1a are is a detailed schematic block diagrams of the uninterruptible power supply (UPS) system according to the present invention.

FIGS. 12a, 12b, 12c, 12d, 12e, 12f, 12g and 12h are circuit diagram of the analog inputs to the microprocessor depicted in FIG. 11.

FIGS. 13a, 13b, 13c and 13d are circuit diagram of the output and communication circuits of the microprocessor depicted in FIG. 11.

FIGS. 14a, 14b, 14c, 14d and 14e are circuit diagrams of the power supplies and associated circuitry depicted in FIG. 1.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
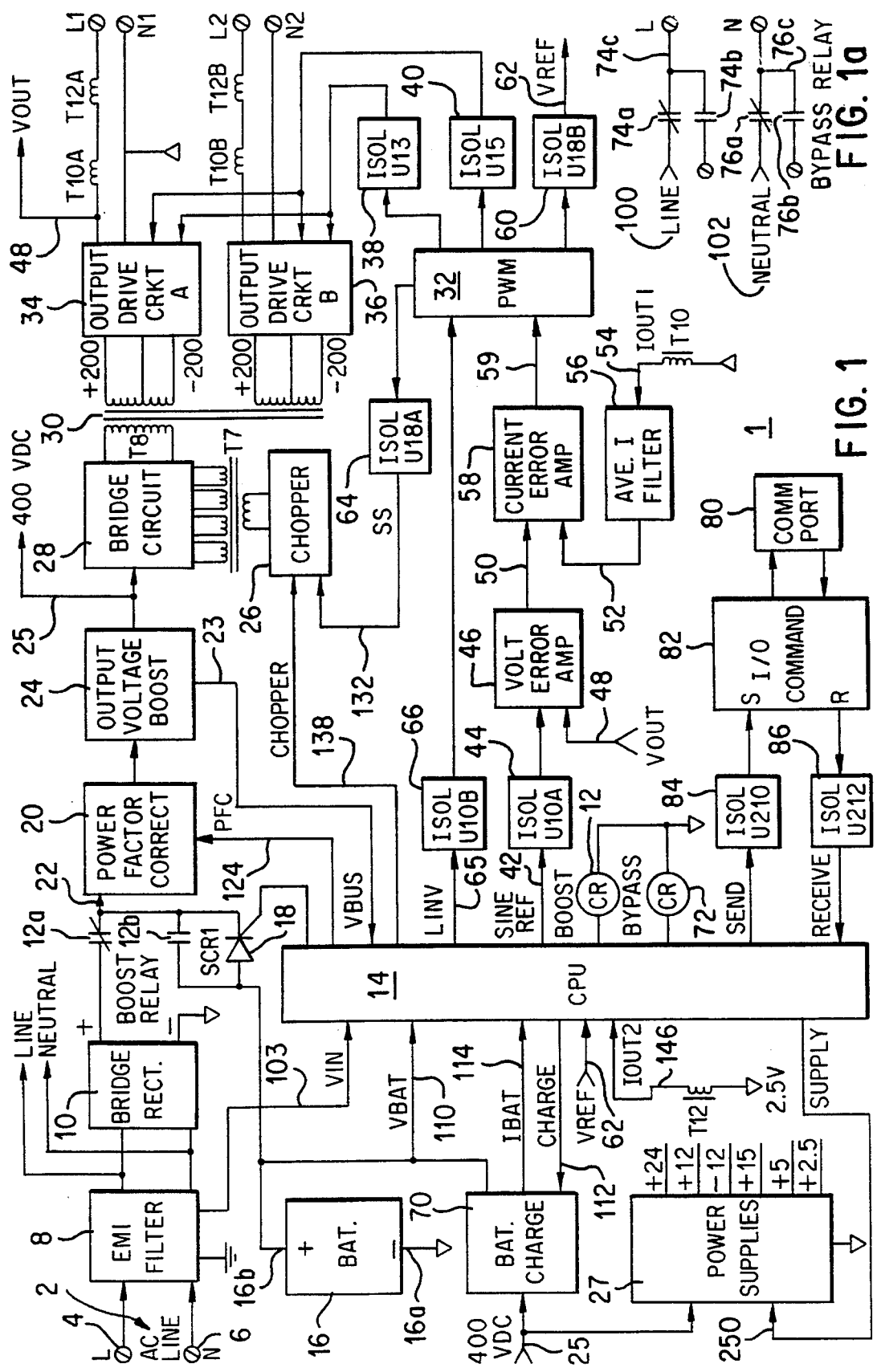

The preferred embodiment can be best understood by referring to FIG. 1 which illustrates a detailed schematic block diagram of the uninterruptible power supply (UPS) system 1. Incoming AC input voltage 2 is connected to input terminals 4, 6 which are coupled to an EMI filter 8 to reduce the effects of transients that might be present from the AC source or transmission lines. The Line and Neutral lines from the filter 8 are converted by bridge rectifier 10 to a +DC and −DC voltage. The +DC voltage is connected to a normally-closed contact 12a of boost relay 12. The −DC voltage is referenced to system ground as is the negative terminal 16a of battery 16, for which the preferred embodiment is nominally 48 VDC but could be other voltages as well. The positive terminal 16b of battery 16 is coupled to a normally open contact 12b of boost relay 12 and to the anode of SCR 18. Boost relay 12 is controlled by CPU 14 and provides the transfer means for supplying the operating power for the remainder of the UPS system 1 from either the battery 12 or the AC input voltage 2. Boost relay 12 also shorts out SCR 18 to eliminate the power losses in it when the battery 12 is the source of the operating power.

The CPU monitors the AC input voltage 2 as represented by VIN and the battery 16 voltage VBAT. In the normal mode, wherein the AC input voltage 2 and therefore, VIN, is within established limits or tolerances, the boost relay 12 is deenergized and power factor correction control circuit 20 is supplied at input 22 with the +DC voltage from bridge rectifier 10 through contact 12a. In the battery backup mode, wherein VIN is outside these limits, CPU 14 supplies gate current to turn on SCR 18 and energizes the boost relay 12 after a short time delay. This is to prevent power losses in SCR 18 during the battery backup mode and also prevents the UPS device 1 from back-feeding into the AC line source 2. The battery 16 then supplies the power at input 22 for the power factor correction control circuit 20 through contact 12b. CPU 14 continues to monitor the AC input voltage and will transfer back to the normal mode when VIN returns to its allowable tolerances and when phase lock occurs between the AC input source 2 and the AC power output L1, N1. The power factor correction control 20 in conjunction with an output voltage boost circuit 24 optimizes the selected voltage at input 22 to create a 400 VDC bus 25 whether input 22 is supplied from the AC input line 2 or the battery 16. The 400 VDC bus 25, in addition to supplying power for the output circuits of the UPS device 1, also is the source of power for the various power supplies 27 that power the circuitry in UPS device 1. Power factor correction (PFC) 14 provides the control signal PFC to enable the power factor correction control circuit 20.

An inverter comprised of chopper 26 and bridge driver circuit 28 converts the 400 VDC bus 25 to an intermediate AC voltage 30. The chopper 26 is also controlled by CPU 14. Transformer T8 isolates and couples the intermediate AC voltage 30 to the output inverter circuits which rectifies the secondary AC voltage to produce a +DC and −DC voltage which is then reconverted back to AC. The output inverter circuits consist of a pulse width modulator 32 and isolated output drive circuit A 34 and drive circuit B 36. Pulse width modulator 32 provides the gate drive signals to output drive circuit A 34 and drive circuit B 36 through isolator 38 and 40, respectively. The AC output of output drive circuit A 34 is connected to output terminals L1 and N1 and the AC output of output drive circuit B 36 is connected to output terminals L2 and N2. These terminals are used for connecting the load to the UPS system 1 and provide separate and isolated AC outputs that could be connected in series to provide a higher voltage output. If L1-N1 and L2-N2 are 120 VAC, the combination would result in 240 VAC, for instance.

The inverter consists of a switch mode power amplifier and has an inner feedback control loop within the overall output voltage control loop to provide improved output voltage and frequency stability. CPU 14 produces a sine refinance signal 42 that is used to provide synchronization of the output AC voltage when a transfer is made between the AC Line 2 and the battery 16 as the source of power for the UPS system 1. Sine reference signal 42 passes through isolator 44 to voltage error amplifier 46 where it is is compared with an attenuated VOUT signal 48 which is representative of the actual AC output L1. The voltage error amplifier 46 produces an error output signal 50 that is proportional to the difference between the desired output and the actual output at L1-N1 and L2-N2. In prior art systems, output signal 50 would be fed to the pulse width modulator 32 to complete the outer control loop. Instead of this, an inner control loop uses output signal 50 and current feedback signal 52 to effectively produce a voltage controlled current source. Current transformer T10 produces a signal IOUT1 54 that is proportional to the total current drawn by the loads connected to terminals L1-N1 and L2-N2. IOUT1 54 is coupled to an average current filter 56 to produce current feedback signal 52 which is feed to a current error amplifier 56. An error in output voltage as indicated by error output signal 50 can be interpreted by the inner loop as a change in demand for output current. The current error amplifier 56 responds through output 59 which is a current error signal that controls the duty cycle of pulse width modulator 32.

CPU 14 samples the output voltage with respect to frequency and magnitude through isolator 60 which provides signal line VREF 62. VREF 62 is compared with VIN in CPU 14 as part of a phase locked loop function to produce the sine reference signal 42 to regulate the output frequency and phase angle of the AC outputs. CPU 14 also functions to shutdown PWM 32 and thus the AC outputs L1-N1 and L2-N2 and UPS system 1 when the battery 16 has discharged to a level that no longer can sustain the AC output voltage within established limits. This is accomplished by signal LINV 65 through isolator 66 which clamps the outputs of PWM 32. PWM 32 also provides a shutdown signal SS to chopper circuit 26 through isolator 64. CPU 14 also samples the output current through current transformer T12 which produces signal line IOUT2.

Battery charge circuit 70 is controlled by CPU 14 through signal line CHARGE to maintain the battery 16 at full charge during the normal mode of operation. Signal line IBAT provides a signal proportional to battery current and signal line VBAT provides a signal proportional to battery voltage to CPU 14. CPU 14 uses these signals to compute and predicate battery 16 performance and requirements. As such, CPU sets different charge rates, allowing battery charge circuit 70 to charge battery 16 at a higher rate when it is discharged and at a trickle rate when it is fully charge to maintain a float charge on the battery 16.

A further function of CPU 14 is to control the energization of bypass relay 72 which provides a means of supplying the load from either the AC line directly or through the on-line UPS device 1. AC voltage is coupled to a pair of normally-closed contacts 74a, 76a of bypass relay 72. The normally-open contacts 74b, 76b of bypass relay 72 are coupled to output. either AC outputs L1-N1 or L2-N2 or both. CPU 14 keeps bypass relay 72 energized whenever the UPS device 1 is to supply power to the load connected to common terminals 74c, 76c. If the AC line is to be the source of power, or if there is a malfunction with UPS device 1, bypass relay 72 is deenergized.

Communication with the CPU 14 and thus the UPS device 1 is through communication port 80. An I/O command circuit 82 provides the protocol and physical parameters for the interface and isolators 84, 86 provide the isolation for send and receive signals between the communication network and the UPS device 1.

Figure 2:
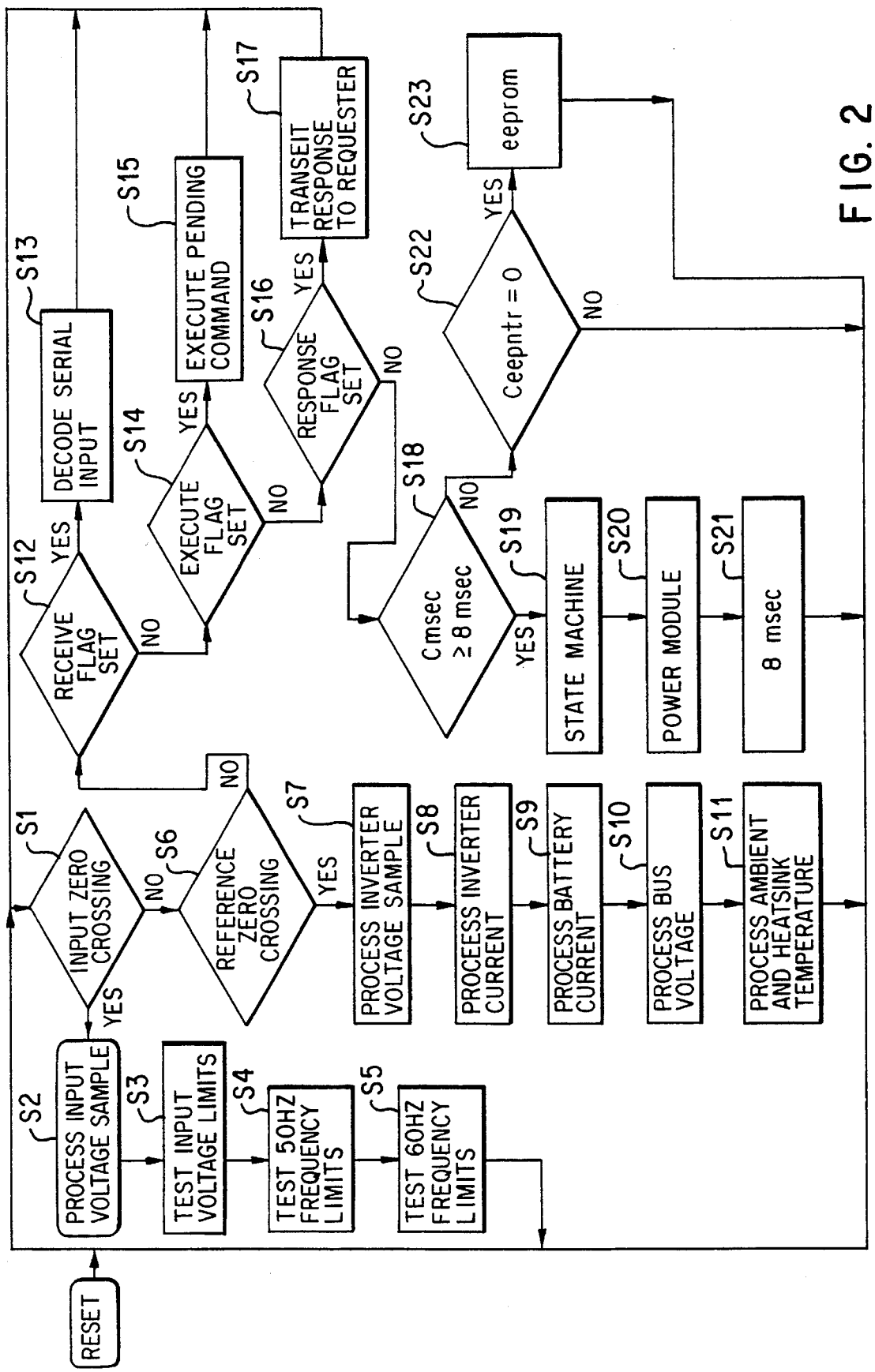
FIG. 2 is a flow chart of the general sequence of operations of the UPS system as depicted in FIG. 1.

CPU 14 controls the operation of UPS device 1 generally as represented by the flow chart of FIG. 2. Upon initialization and reset, and the system in the normal mode of operation whereby the AC line supplies the input power, Step 1 looks for a voltage zero crossing of the AC line input. At a zero crossing, Steps S2 and S3 examine the AC line input voltage and its voltage limits to determine if the AC line or the battery will be the source of the output power. Steps S4 and S5 determine the AC line input frequency. This is to set the output voltage level under the assumption that 50 Hz is associated with an output voltage of 230 volts and 60 Hz with an output voltage of 120 volts. If the AC input voltage is not at a zero crossing, Step S6 looks for a reference voltage zero crossing to place the CPU 14 in either a data gathering mode or in a control mode. In the data gathering mode, Steps S7 and S8 sample the output voltage VOUT 48 and output current IOUT2 of the UPS device 1. Step 9 allows CPU 14 to monitor and control the charging of the battery 16 by analyzing the battery current IBAT and voltage level VBAT. As another sequence in the control of the output voltage regulation, Step 10 is associated with maintaining the 400 VDC bus 25 within designated tolerances and enabling the power factor correction circuit 20 through signal PFC. Step S11 adds protection for the output driver circuits by computing the temperature rises of the various output semiconductors mounted on a heat sink typically required in power conversion equipment. If any temperature rises are excessive or place the output semiconductors outside of their safe operating region, CPU 14 would cause an orderly shutdown of UPS device 1. If temperature rises are normal and within limits, Step 1 is repeated, and CPU 14 switches to the control mode, starting with Step S12.

In the control mode, CPU 14 starts a communications sequence, looking to see if any messages from external devices connected to the communications port 80 have been received and decoding them at Step S13 if there were any receptions. If not, any pending commands from the interrupt routines will be executed at Step S14. Steps S16 and S17 will send messages to the external devices connected to the communications port 80 if there are any to be sent. Messages that are to be sent or received can be control, diagnostic, or data in general, but are not restricted to these types. If there are no communication requirements at this time, the CPU 14 will enter the state machine sequence S19 and will, based on the data gathered in Steps S7 through S11, provide the decision making and control signals that determine the ultimate operation of the UPS device 1. As long as the output AC voltage is in specification or established voltage limits, the load will be supplied from the input AC line. Otherwise, the state machine routine will transfer to the standby mode and allow the battery to become the source of output power. The power module sequence S20 generates the timing signal CHOPPER for the chopper circuit 28 and the LINV signal which disables the output PWM inverter 32. A separate routine in Steps S22 and S23 provides an update in non-volatile memory of operating conditions and parameters for use in diagnostics and when, for instance, power is completely lost or the battery has discharged below sustainable AC output power.

Figures 3, 4:
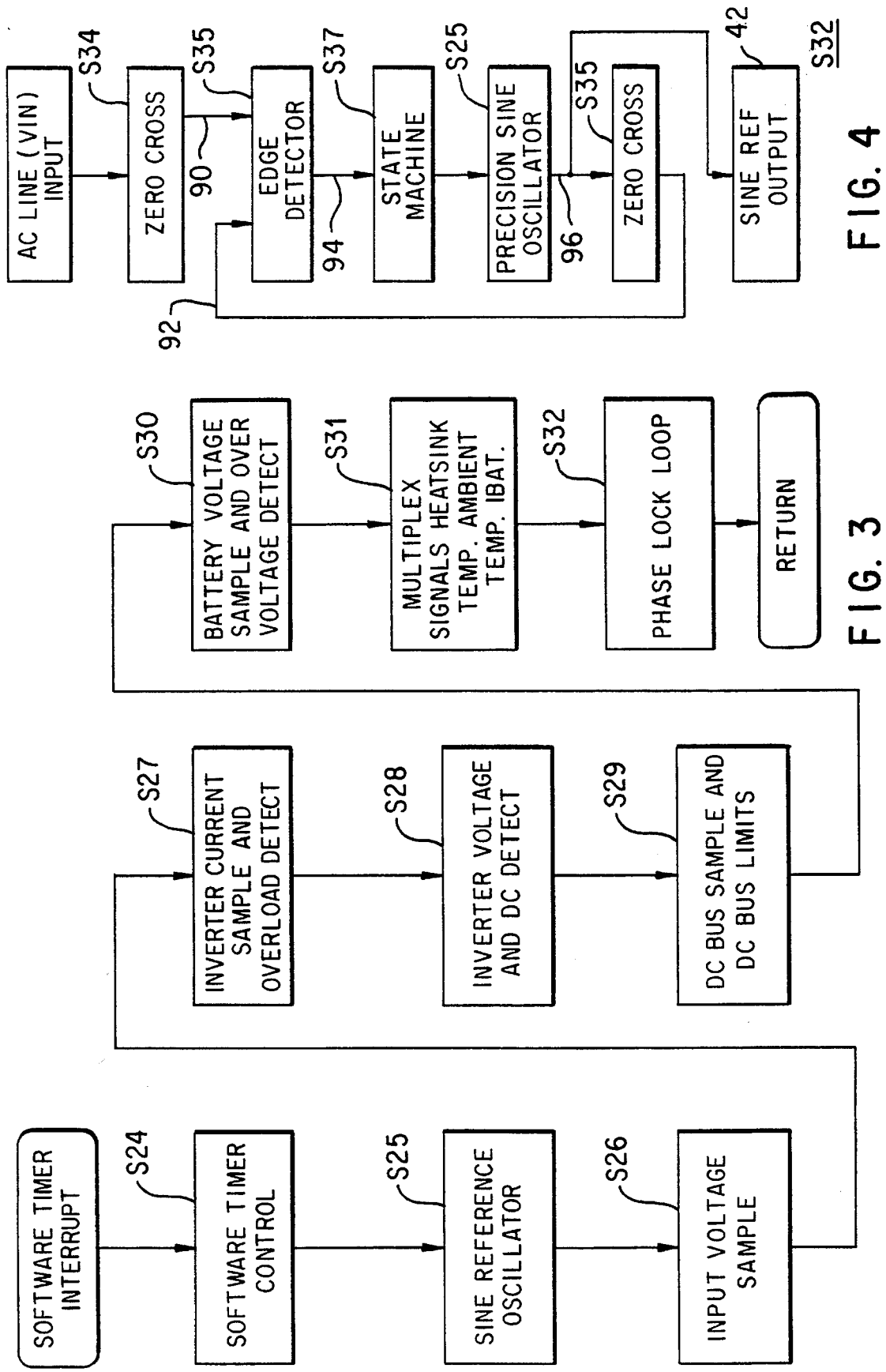
FIG. 3 is a flow chart of the general sequence of operations during a software timer interrupt of the UPS system as depicted in FIG. 1.
FIG. 4 is a flow chart of the general sequence of operations during a phase lock loop routine providing the input/output AC line synchronization sequence of the UPS system as depicted in FIG. 1.

FIG. 3 provides a more detailed sequence of operations which occurs during a software timer interrupt. Step 24 controls the interrupt timer which starts this sequence. In the preferred embodiment, the interrupt timer or sample period is set for 250 microseconds but is not restricted to this time. The sine reference oscillator sequence S25 produces the low distortion sine wave reference signal 42 which is used to control the output frequency and phase angle of PWM circuit 32. The sine wave reference signal 42 is created by using two registers, one for accumulating the phase angle and the other for providing a frequency control value. During each sample period, the accumulator is replaced by the sum of the accumulator and the frequency control value. This is continued until the accumulator overflows and resets, which represents one cycle and corresponds to a zero crossing. Phase shift can be accomplished by changing the accumulator value and frequency shift is controlled by changing the frequency control register. Look-up tables provide the incremental values. The frequency is as determined during Steps S2 through S5. Sequence Steps S26 through S31 represent standard techniques for gathering, measuring and determining voltage, current, and temperature values for use in the control portion of the state machine Step S19 to ultimately control the UPS device 1.

Step S32 provides the phase lock loop function that is an integral part of the UPS device 1. Step S32 emulates the phase lock loop function that is similar in function to Harris Semiconductor's type CD4046B without requiring all the necessary external components for filtering and establishing operating limits. Additionally, since discrete phase lock loops treat frequency and phase independently, separate control loops are required with inherent limit cycle problems since these parameters are not independent variables. Step S32 digitizes the analog signals and processes them in the discrete time domain. Frequency and phase angle are corrected simultaneously. FIG. 4 details the operation of Step S32 in greater depth. In normal operation, the AC line 2 is sampled via VIN and processed during Step S34 to determine its negative to positive voltage zero crossing point. A similar zero crossing detector sequence S35 determines the negative to positive voltage zero crossing point for the output of Step S32 which is the SINE REF signal 42 used to control and regulate the output frequency and phase angle of the AC outputs L1-N1 and L2-N2. Step S36 compares output 90 of Step S34 with output 92 of Step S35 to produce an error signal 94 indicating that the output 90 is in-phase, lower in-phase or higher in-phase with output 92. The state machine, Step S37 provides the control signals for phase shifting or frequency shifting the sine reference oscillator S25 described above to lock-in and synchronize the precision sine wave 96 with the AC line 2. In standby operation, due to low or lost AC line voltage, the state machine disables the phase lock loop function and allows the sine reference oscillator S25 to free run at the frequency as determined during Steps S2 through S5. Upon return within acceptable tolerances of the AC line 2, the state machine Step S37 enables the phase lock loop function and allows the precision sine wave 96 to return to gradual phase synchronization with the AC line 2. This smooth transition eliminates any sudden voltage changes in the AC output that could produce and send large voltage spikes to the load and prevents the UPS device 1 from absorbing large, instantaneous amounts of current.

To increase stability and prevent output jitter, the state machine Step S37 provides a means of compensating for variations in actual voltage zero crossing as detected in Steps S34 and S35 due to the 250 microsecond timed interrupt sequence. Without this compensation, an error close to 250 microseconds could occur if the zero crossing of the AC line 2 occurred at the beginning of the period and the zero crossing of the precision sine wave 96 occurred at the end of the sequence. The compensation will result in adding or subtracting time to the zero crossing occurrences depending on the time during the sequence the event occurred to prevent jitter in the AC output from cycle to cycle.

Figure 5A:
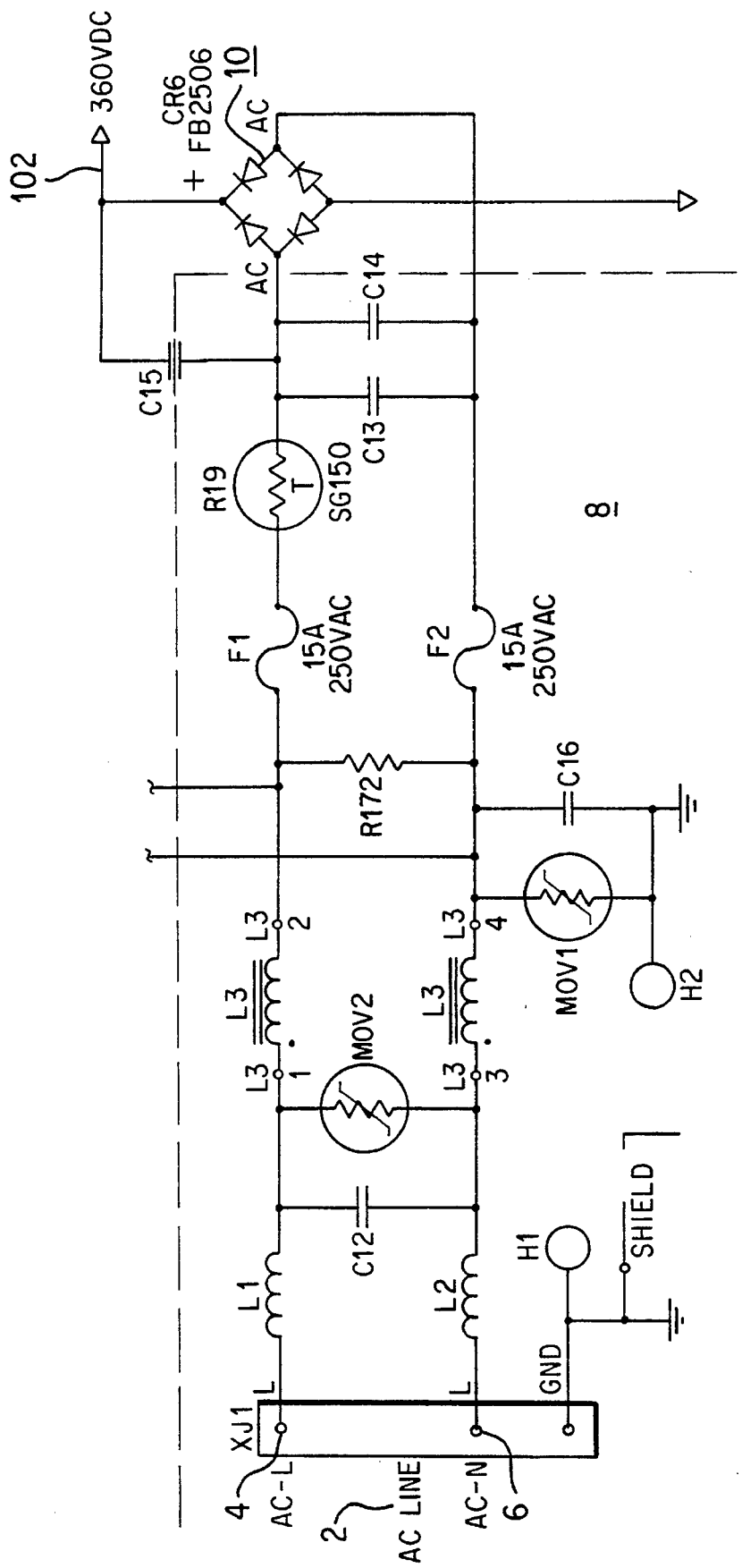
FIGS. 5a and 5b are is a circuit diagrams of the AC input and the first AC-DC converter circuitry depicted in FIG. 1.
Figure 5B:
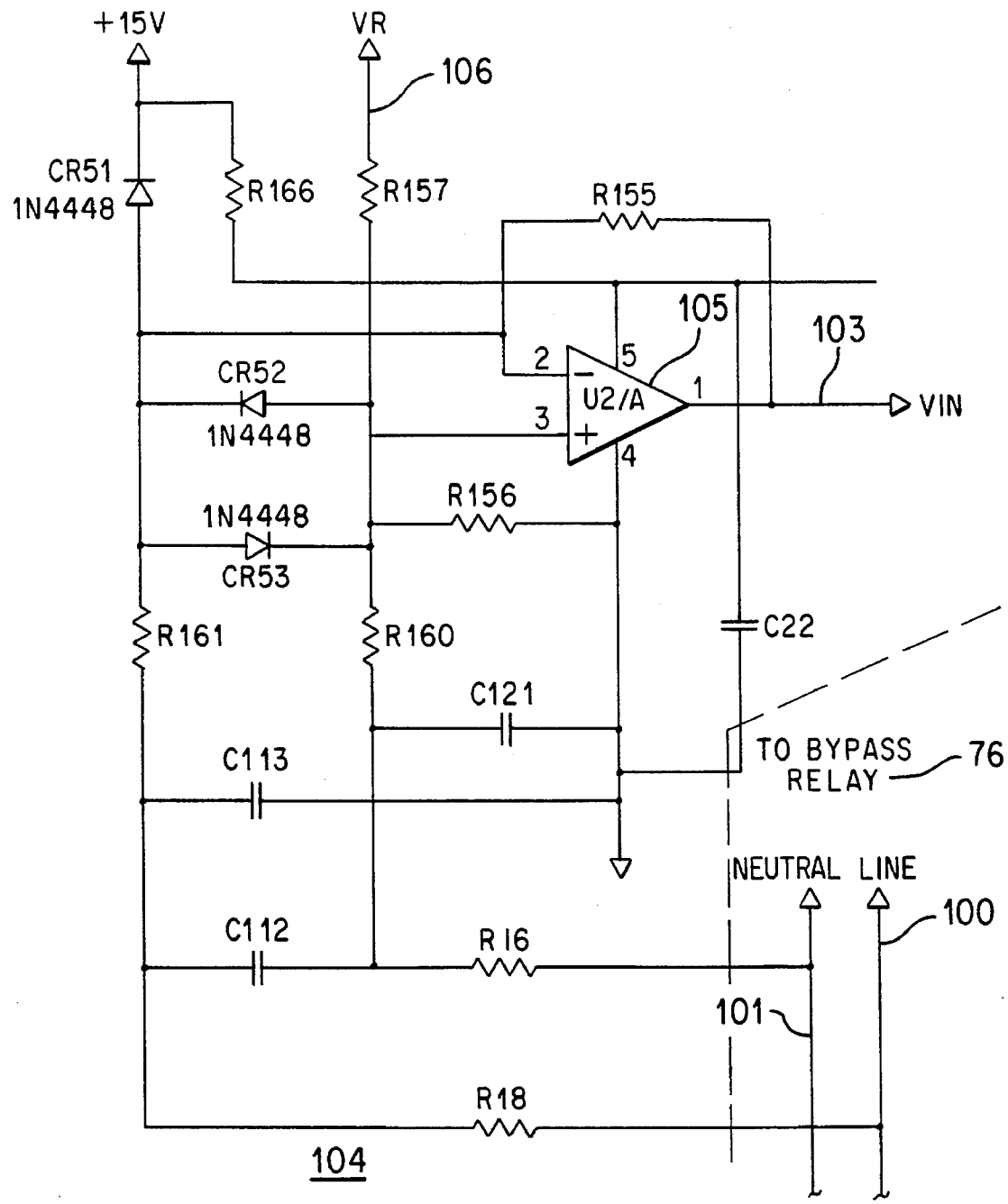

Referring to FIGS. 5a and 5b, The AC line 2 enters the UPS device 1 at terminals 4 and 6, where it is filtered by the EMI filter 8 comprised of inductors L1-L3, C12, and resistor R172. Metal oxides varistor MOV 1 and MOV 2 provides transient surge protection. The filtered AC line 100 and neutral 101 feed full bridge rectifier through fuses F1 and F2 10 to produce a rectified AC voltage 102. The filtered AC line 100 and neutral 101 are coupled to the bypass relay 76 and are also connected to a wave shaping and scaling circuit 104 to produce the AC line reference signal VIN 103 through buffer 105. Resistors R16, R18, and R161 attenuate the filtered AC line 100 down to the 5 VDC level as referenced by the VR signal 106.

Figure 6:
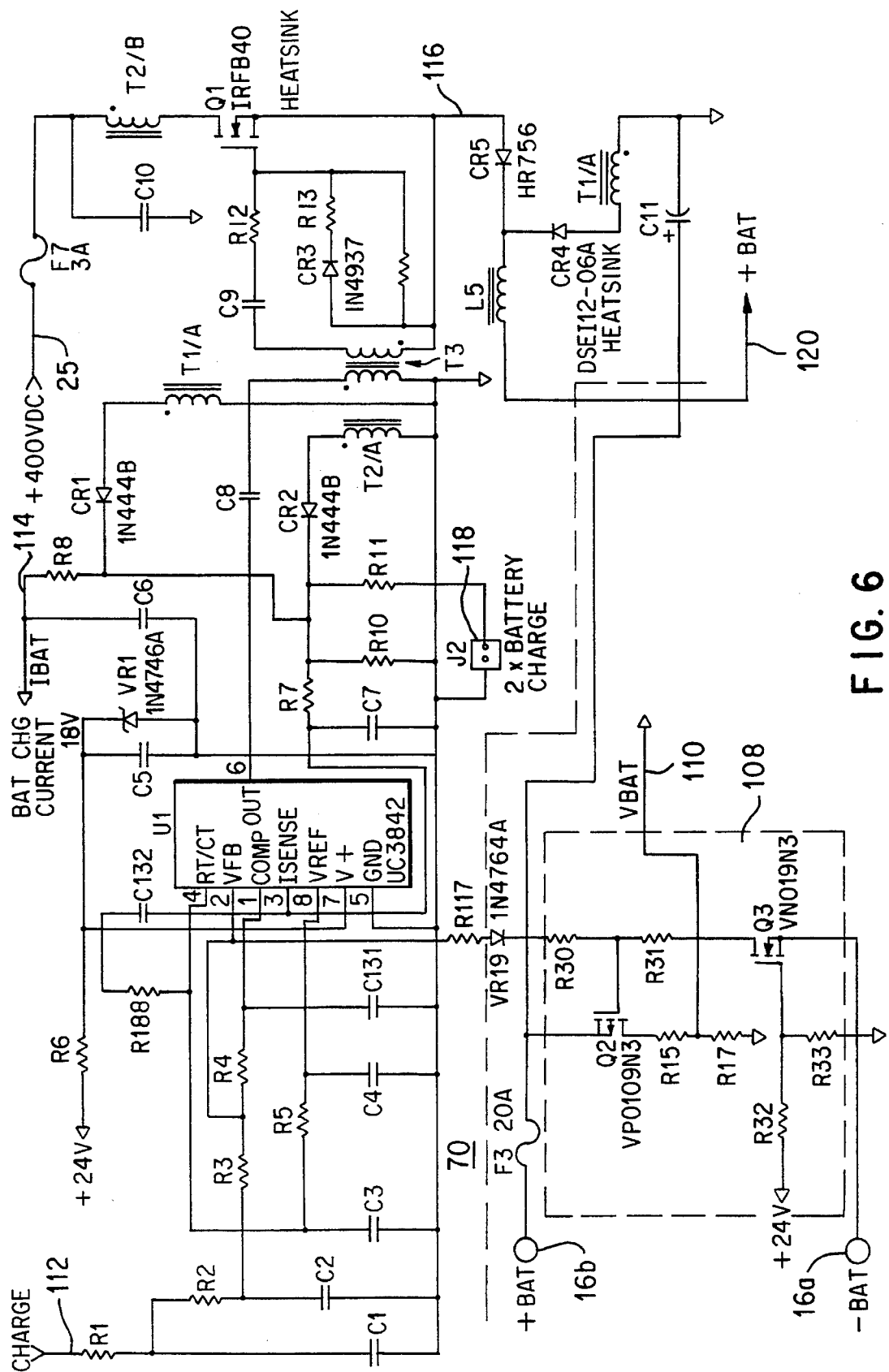
FIG. 6 is a circuit diagram of the battery and battery charger circuitry depicted in FIG. 1.

The positive terminal 16b of battery 16 is coupled to fuse F3 and the negative terminal becomes the UPS device 1 ground reference as depicted in FIG. 6. Voltage divider circuit 108 combines to produce VBAT signal 110 which is proportional to the actual battery voltage. VBAT is converted by an internal A/D converter in CPU 14 to a digital representation of the battery voltage. The battery charger circuit 70 consists of a standard continuous mode buck switching regulator, utilizing a current mode pulse width modulator chip U1 such as an Unitrode type UC3842, and will therefore not be described in detail. The 400 VDC bus 25 becomes the source of the power to charge the battery 16. Control of the regulator U1 is by CHARGE signal 112 which is generated by CPU 14. Regulator U1 drives transistor Q1 to pulse width modulate the 400 VDC bus 25. If the battery is highly discharged, the output 116 of the regulator circuit will be higher than if the battery is fully charged at which time the charge circuit 70 will provide a trickle charge to the battery 16. Diode CR5 couples the output 116 of the charger 70 to the battery +terminal 16b through inductor L5 and the fuse F3 as represented by the +BAT signal 120. Battery charge current is represented by IBAT signal 114 which is monitored by CPU 14. A shorting strap or jumper 118 provides a means to double the battery charging rate.

Figure 7A:
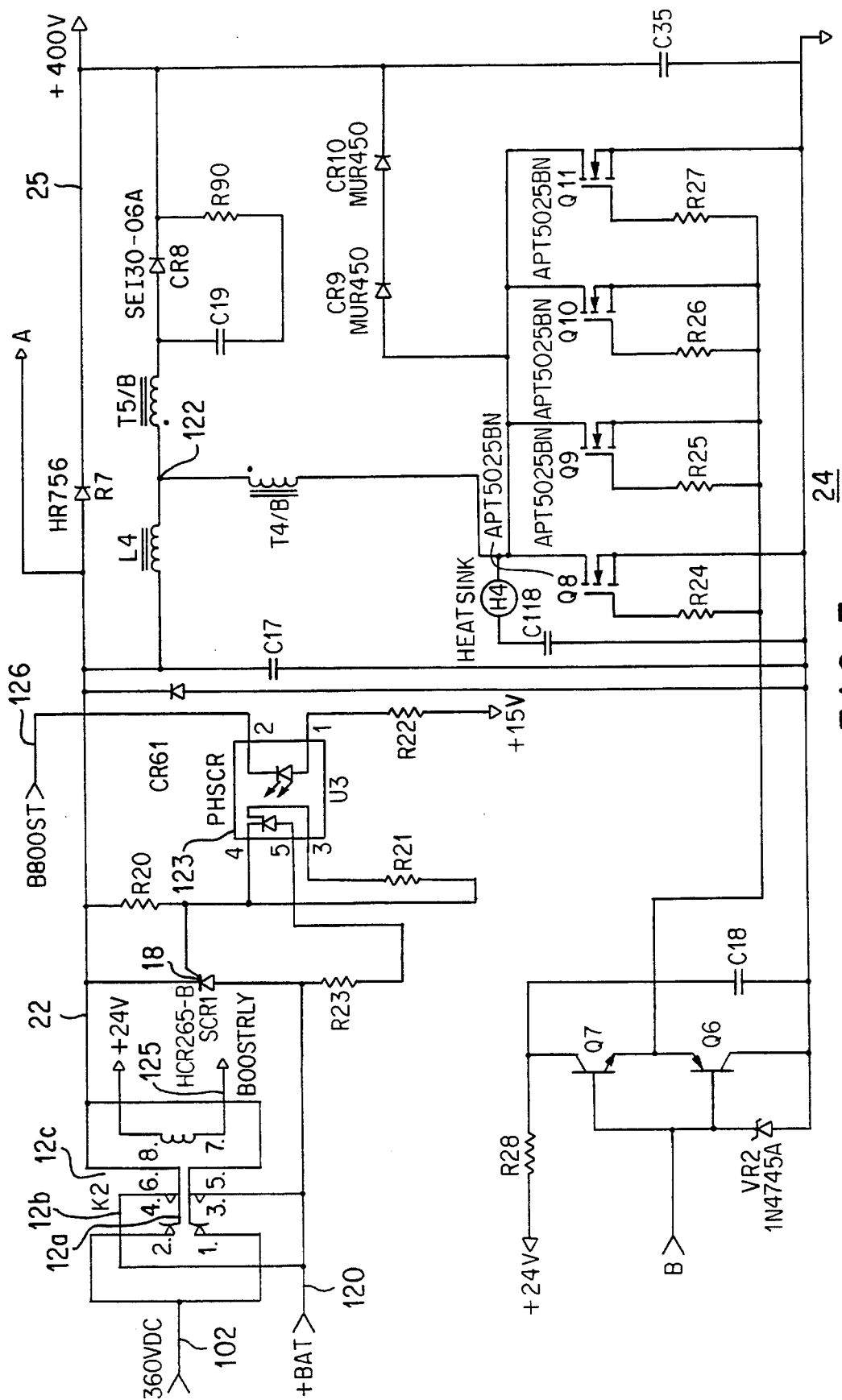
FIGS. 7a and 7b are circuit diagrams of the power factor correction and output voltage boost circuits depicted in FIG. 1.
Figure 7B:
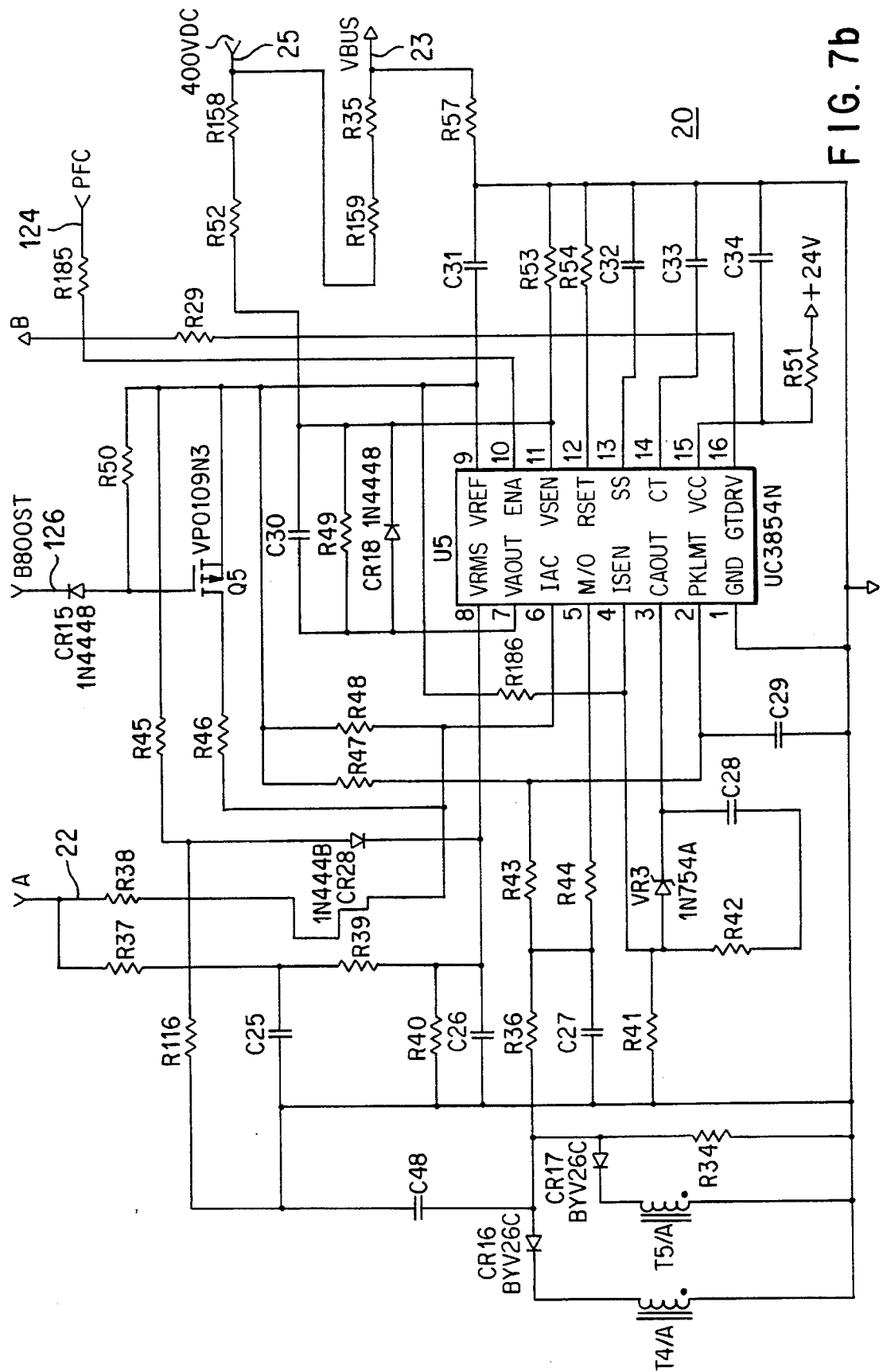

The power factor correction control circuit 20 and voltage boost circuit 24 are depicted in FIGS. 7a and 7b and combine to function as a 400 VDC regulator. U5, which is a Unitrode UC3854 IC package, provides the necessary circuitry to perform these functions. The operation of U5 utilizing a boost configuration is well known to those skilled in the art and is not an object of the invention. It has an inner current loop and an outer voltage loop. The outer loop senses the 400 VDC output bus 25 as developed across capacitors C35 and the C36–C37 series combination and keeps it constant by regulating the line current. The rectified AC voltage 102 is coupled to the normally-closed contacts 12a of battery boost relay 12 which is deenergized in the normal mode of operation of the UPS device 1. The output 12c of the relay 12 is connected to node 22. U5 samples the node 22 voltage at pin 8 through R37 and R39 and samples the current at node 22 through R38 at pin 6. The input inductor L4 connected between node 22 and node 122, in addition to coupling the 360 VDC bus 102 to the regulator circuit, provides noise immunity from line transients. Pin 16 of U5 controls the conduction of transistors Q7 and Q8, which in turn, control the conduction of transistors Q8–Q11. Q8–Q11 provide the means for charging the inductor L4. Transformer T4 measures Q8–Q11 drain current and transformer T5 coupled between node 122 and switching diode CR8 measures the diode current. Added together by diodes CR16 and CR17, a measure of current in inductor L4 can be obtained. This current is converted to a voltage across resistor R34 and is used by U5 to control the AC input current to complete the buck function. The 400 VDC bus 25 is built-up across capacitors C35 and the C36–C37. Current for the remaining circuitry of the UPS device 1 is drawn from the charge stored in these capacitors instead of directly from the incoming AC line 2 or battery 16. U5 and related circuitry forces the charging current waveform to follow the AC line voltage waveform, thus resulting in a near unity power factor. Diodes CR9–10 protect transistors Q8–Q11 from excessive voltage spikes caused by the switching functions and circuit board component layout. PFC signal 124 is generated by CPU 14 to either enable or disable the power factor correction circuit 20. Precision resistors R159, R35, and R57 voltage divides the 400 VDC bus 25 to produce VBUS signal 23 which becomes proportional to the bus 25. VBUS 23 becomes an input to CPU 14 to allow for monitoring the status and reserve of the UPS device 1.

In the battery backup mode, CPU 14 provides gate drive for photo-SCR 123 through RBOOST signal 126. Photo-SCR 123 then turns on SCR 18 which couples +BAT 120 to node 22. CPU 14 energizes relay 12 via BOOSTRLY signal 125. Battery 16 voltage +BAT 120, which is typically 48 VDC, although other voltages could be used as well, is connected to the normally-open contacts 12b of relay 12. Upon energization of relay 12, +BAT 120 is connected directly to node 22, eliminating the voltage drop and power loss across SCR 18. The opening of the normally-closed contacts 12a effectively removes the AC line 2 from supplying the power for the UPS device 1 and the load and prevents the UPS device from backfeeding into the AC line. Since the battery 12 voltage is considerably lower than the rectified AC line 2 voltage, the multiplier circuit internal to U5 must be changed to provide compensation. RBOOST signal 126 gates transistor Q5 to change the current sense input IAC at pin 6 of U5, which effects this change. Thus the power factor correction circuit 20 can supply the 400 VDC bus 25 from either the AC line 2 or the battery 12.

Figure 8A:
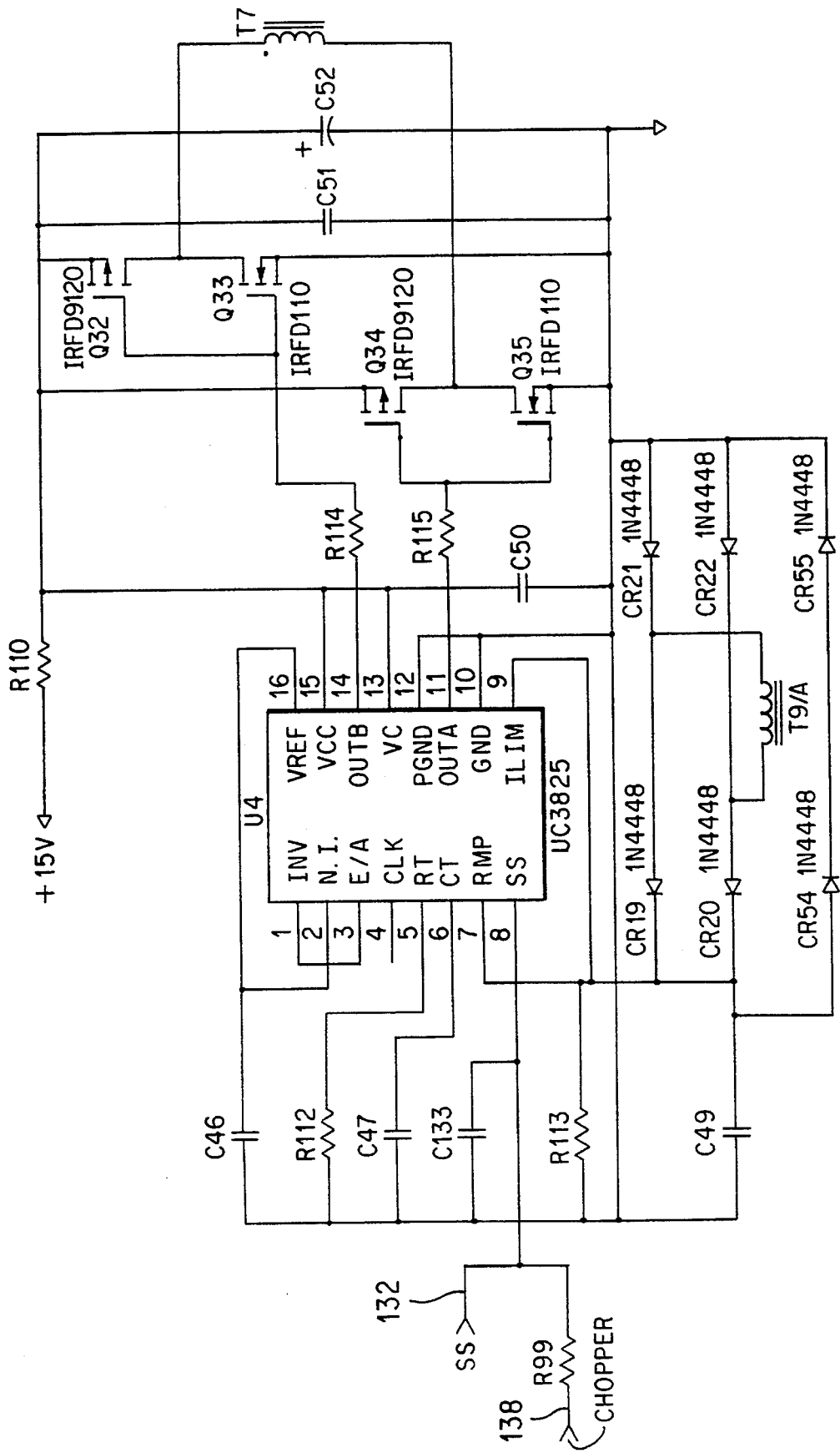
FIGS. 8a and 8b are circuit diagrams of the first DC-AC power inverter utilizing a chopper with a four quadrant driver circuit as depicted in FIG. 1.
Figure 8B:
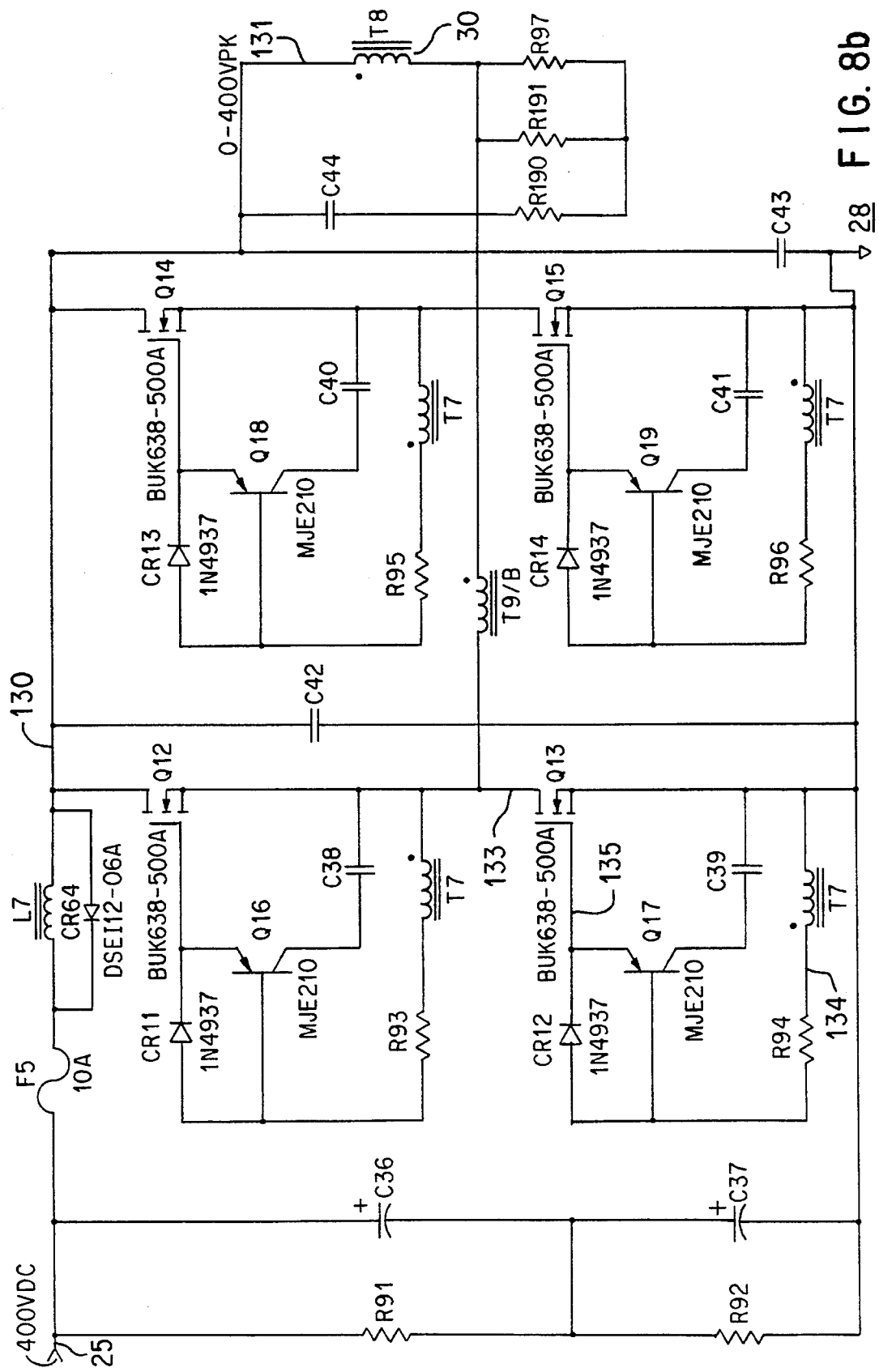

FIGS. 8a and 8b detail the chopper circuit 26 and the bridge circuit 28 which combine to create a DC to AC inverter function to provide input to output voltage isolation. A conventional high speed PWM controller IC chip U4, such as an Unitrode type UC3825, provides the control means for the driver circuits. PWM controller U4 operates at a switching frequency of approximately 100 KHz and is configured to limit peak output current. The totem pole output, pins 11 and 14, is boosted by power MOSFETs Q32–Q35 to provide sufficient power to switch opposite legs of the primary winding of transformer T7. The quad secondary windings of T7 couple the output of the chopper circuit 26 to bridge circuit 28 consisting of four identical driver circuits to provide full four quadrant conduction.

The 400 VDC bus 25 as stored in the series combination of capacitors C36–37 is coupled through fuse F5 to one side of input inductor L7. Node 130 connects the other side of L7 to the drain terminal of MOS transistors Q12 and Q14. Node 131 connects one side of the primary of transformer T8 to the drain terminal of MOS transistors Q13 and Q15 and to the source terminal of MOS transistors Q12 and Q14. The other side of the primary of T8 is coupled to one primary lead of current transformer T9. The other primary lead of T9 is connected to junction 133 of the source terminal of MOS transistor Q12 and the drain terminal of MOS transistor Q13. The source terminal of MOS transistors Q13 and Q15 is connected to system ground. Gate drive signals from the chopper circuit 26 as coupled through the quad secondaries of T7 cause conduction of transistors Q16–Q19 to provide gate drive for Q12–Q15 respectively.

When transformer T7 produces a positive voltage through the secondary winding at 134, the voltage across resistor R94 increases exponentially and is coupled through diode CR12 to the gate 135 of FET transistor Q13. Q13 could also be an insulated gate bipolar transistor. When the turn on gate to source threshold voltage of Q13 is reached, a small voltage plateau is reached until the effective gate to drain capacitance is discharged. At this time, Q13 turns on and the drain voltage is essentially near the source voltage. The voltage at the gate 135 continues to rise exponentially towards +15 VDC, the supply voltage of U4. The charging of the gate to source and gate to drain capacitances are a function of the actual effective value of these capacitances and the current available to charge these capacitances. The current available to accomplish this is equal to the transformer T7 voltage minus the diode CR12 voltage, minus the gate to source voltage of Q13, all divided by the resistor R94.

When transformer T7 couples a negative voltage through the secondary winding at 134, transistor Q13 will turn-off faster than it turned on due to transistor Q17 which increases the amount of current extracted from Q13 at turn-off. For a capacitor, capacitance is equal to current times time divided by voltage. Therefore, if more current can be extracted from the capacitance during turn-off than during turn-on, and given that the voltage is equal, it follows that the time for discharge will be less. Accordingly, when node 134 goes negative, the current taken out of gate 135 will be the current through resistor R94 times the BETA of transistor Q17. Capacitor C39 serves as a negative supply voltage for the collector of Q17 and is recharged when transformer T7 secondary approaches –15 VDC. The remaining driver circuits for Q12, Q14 and Q15 function in the same manner.

Full four quadrant conduction through T8 is achieved by alternate conduction of transistor pair Q12 and Q15 for one polarity and Q13 and Q14 for the opposite polarity. When one transistor pair is conducting, the other is not. When Q12 and Q15 are conducting, +400 VDC is present at node 133 while node 131 is almost at 0 volts. When Q13 and Q14 are conducting, +400 VDC is present at node 131 and node 133 is then at 0 volts. The chopper circuit 26 operates at a duty cycle close to 50%. Current flow through T9 is coupled back to provide current feedback to the PWM controller U4 at pins 7 and 9. This current feedback signal will cause the chopper 26 to shutdown if there is a severe overload, i.e., a high demand in current.

Thus, the 400 VDC bus is pulse width modulated through transformer T8 to provide on the dual, center-tapped secondaries of T8 sufficient power to provide the output voltage and current at terminals L1-N1 and L2-N2. SS Signal 132 provides a soft start feature to prevent high inrush currents, controls the maximum duty cycle of U4, and provides a means of shutting down the inverter, and thus the UPS device 1.

FIGS. 9a, 9b, 10a, 10b, 10c and 10d detail the operation of the output inverter consisting of PWM converter 32 and output drive circuits 34 and 36. Output drive circuits 34 and 36 are identical in operation and produce two separate and isolated AC outputs. As previously mentioned, the output inverter functions as an average current mode controller. The inner current error amplifier control loop contains the output inductor L9, the PWM controller 32 which is an IC packaged device such as a Silicon General type SG3731 and identified as U11, and the output driver circuits 34 and 36. This combination serves to regulate the average current in L9. An input to the current error amplifier 58 in this loop is the output of the voltage error amplifier 46. The inner current error amplifier control loop is controlled by the outer voltage error amplifier loop and functions as a voltage controlled current source. This effectively removes L9 from the outer control loop, resulting in a higher frequency response and greater stability of the overall system. An error in output voltage results in an error signal from the voltage error amplifier 46. The inner loop interprets this as a change in demand for output current and responds by adjusting the average current in L9 to decrease the error signal.

Net1004 signal 140 is generated by CPU 14 as a high frequency PWM signal and is a representation of the sinc reference signal as determined by the phase lock loop routine S32. Signal 140 is coupled through isolator 44 to drive the totem pole connected transistors Q36 and Q37. Buffer circuit U8/B converts the output of Q36 and Q37 into a low frequency AC voltage signal 141. This sine reference signal is 180 degrees with respect to the AC input voltage 2 and is compared through resistor R59 at node 142 with an attenuated AC output L1 feedback signal 144 through resistor R60. The ratio of R60/R59 sets the ratio of the two signals. If the output voltage signal 144 equals this ratio times the reference signal 141, node 142 will be zero. If the output signal 144 is in error, a voltage will develop at node 142. The voltage error amplifier U8/B will process this signal to produce the error signal 50 which will be interpreted as a demand for current, either more or less depending on the polarity of error at node 142. Resistor R61 and capacitor C53 provide frequency compensation. Since the inner control loop is a voltage controlled current source, all that is necessary to limit the output current is to limit the voltage input to the inner control loop. Zener diodes VR6 and VR7 perform this function by limiting the error signal to a safe value to protect the output driver circuits 34 and 36 from overcurrent and short circuits. The clipping voltage sets the output current limit setting. With the current demand below this limit, VR6 and VR7 do not limit the output. Exceeding this set limit results in the output simply acting as a constant current source that cannot be exceeded. Resistor R65 converts the error voltage signal 50 into a current and injects it into node 146. Current feedback transformer T10 has two primary windings, one each in the high leg of AC output L1 and L2 and therefore in the inductor L9. The secondary winding therefore couples the sum 52 of the current of both AC outputs and couples the sum 52 to node 146 as an input to current error amplifier circuit 58 as represented by U9 through resistor R66. Resistor R67 provides the burden resistor for current transformer T10 and capacitor C56 provide a noise filtering function. Frequency compensation is provided by resistor R68 and capacitor C61 to shape the gain and phase relationship of the amplifier 58. The current error output 59 becomes the input to PWM converter circuit 32 which converts the current error output 59 into pulse width modulated drive signals 150 and 152 in a totem pole arrangement. The PWM converter circuit 32 utilizes a standard motor control PWM IC chip such as a Silicon General type SG3731 and is identified as U11 in FIG. 9b. Driver signals 150 and 152 through optoisolators 38 and 40 provide the gate signals for output drive circuits 34, 36, respectively. Driver signals 150 and 152 can be disabled by clamping to ground by transistors Q24, Q25 which are controlled through optoisolator U10 by signal LINV 65. CPU 14 generates LINV 65 to shutdown the UPS device when the AC input power 2 or the battery 12 can no longer sustain the AC output power requirements.

Figure 10A:
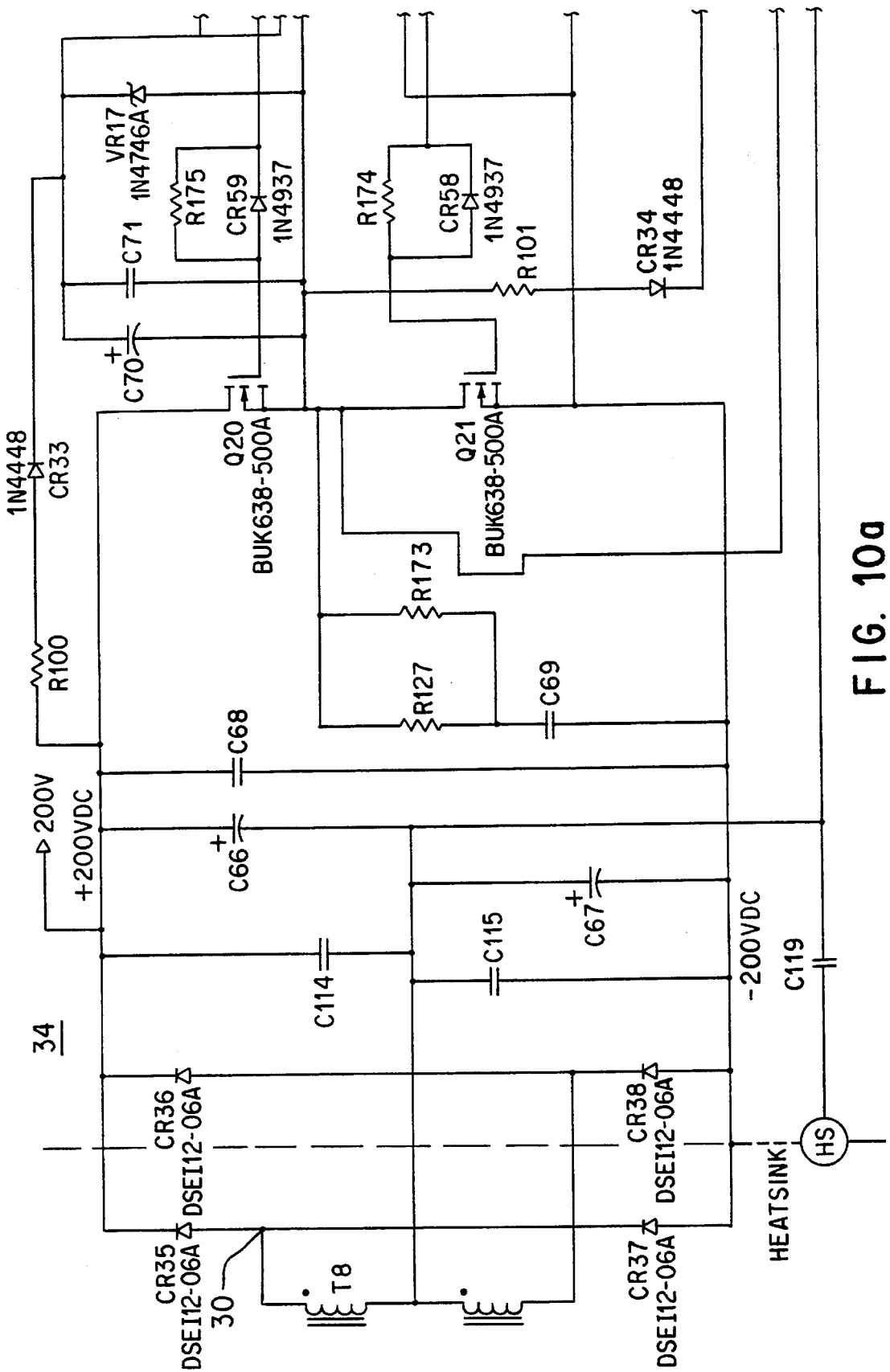
FIGS. 10a, 10b, 10c and 10d are circuit diagrams of the second AC-DC converter and associated driver circuits to produce the AC output voltages as depicted in FIG. 1.
Figure 10B:
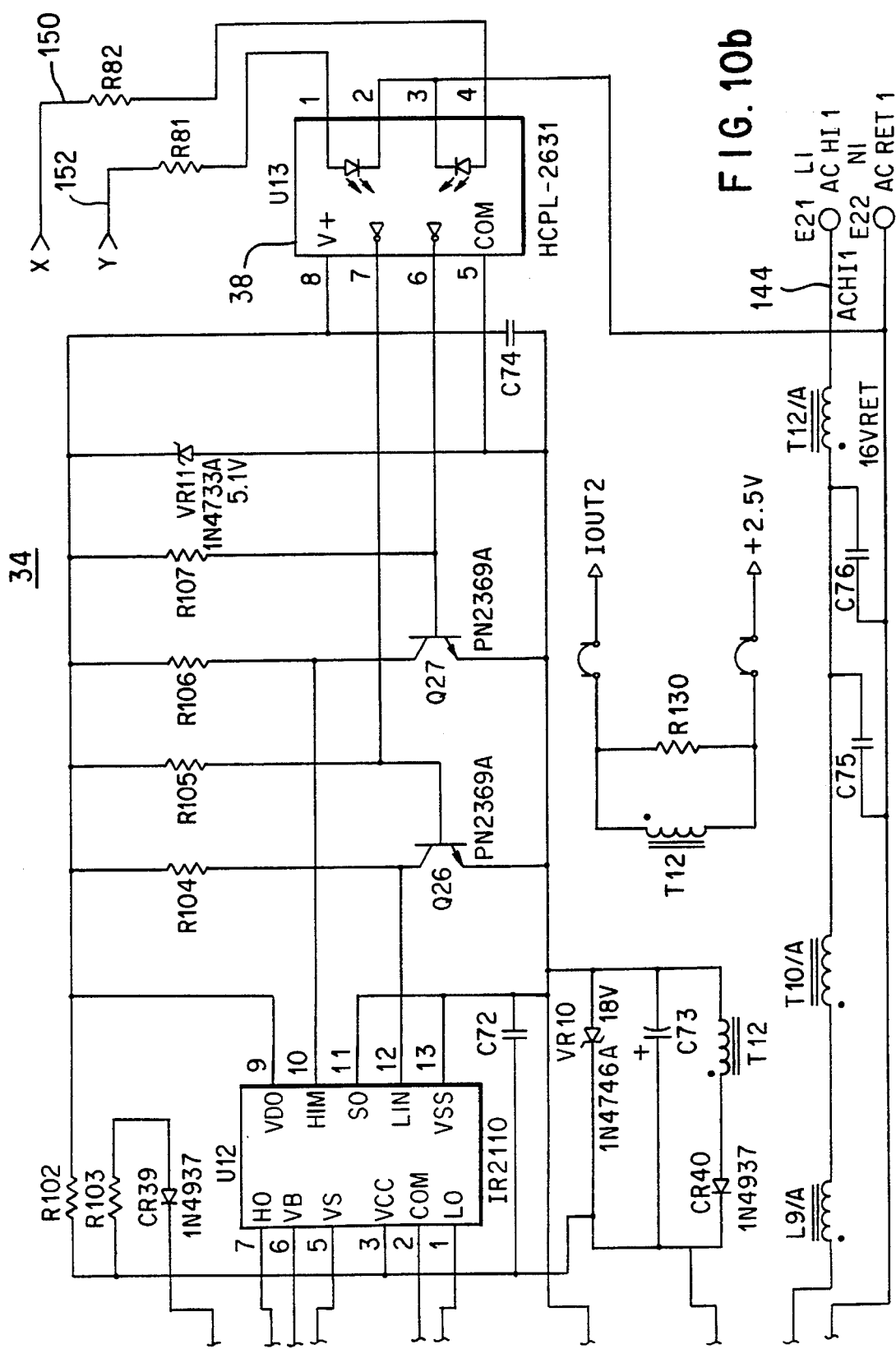

Diodes CR35–CR38 and CR41–CR44 are configured as full bridge rectifiers to create separate plus and minus DC voltage supplies from the dual center tap secondaries of transformer T8. In the preferred embodiment these voltages are 200 VDC. Storage capacitors C66, C67, C77, and C78 filter the produced 200 volt supply rails. Power MOS transistors Q20, Q21 and Q22, Q23 coupled to these rails receive gate signals from driver chips U12 and U14 in response to the driver signals 150 and 152. Driver chips U12 and U14 are half-bridge driver chips that generate the gate drive signals in response to the inputs at pins 10 and 12. Isolators U13 and U15 provide galvanic isolation since the driver chips U12 and U14 are referenced to the −200 VDC rail and the PWM controller is referenced to AC line N1. With respect to driver circuit 34, as illustrated in FIGS. 10a and 10b, the driver signals 150 alternately turn-on transistors Q26, Q27 which input to driver chip U12 to alternately gate Q20 and Q21, resulting in power consisting of a series of width modulated pulses to the output inductor L9 and filter capacitors C75 and C76. L9, C75, and C76 combine to form an output filter that integrates out the high frequency components to produce a sinusodial output signal at output terminals L1 and N1. Current transformer T10 in the L1 output leg provides the current feedback signal for the current error amplifier 58. Current transformer T12 also in the L1 output leg contributes part of the current feedback signal for the total current IOUT2 which is inputted to CPU 14 for use in current monitoring.

Figure 10C:
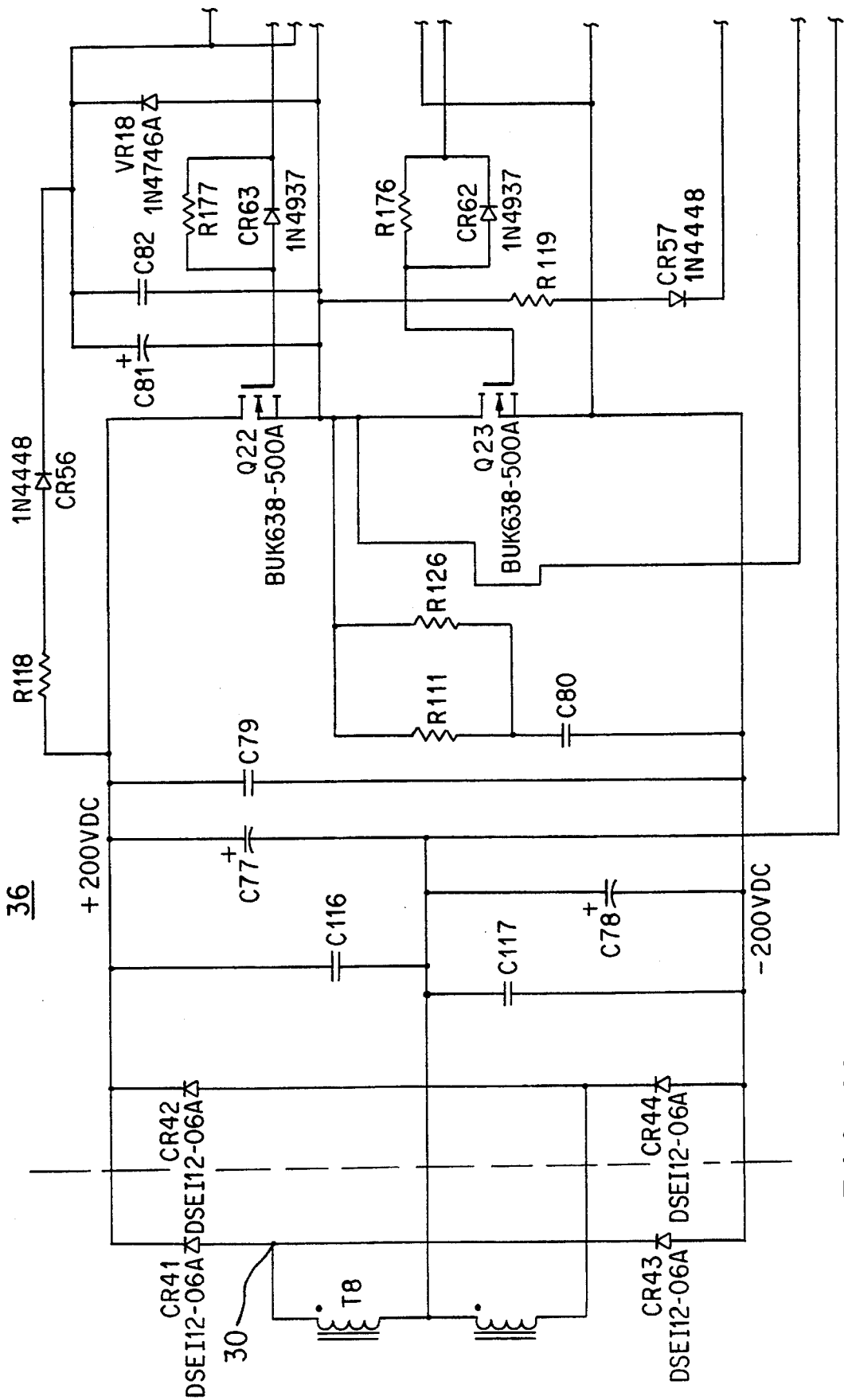
Figure 10D:
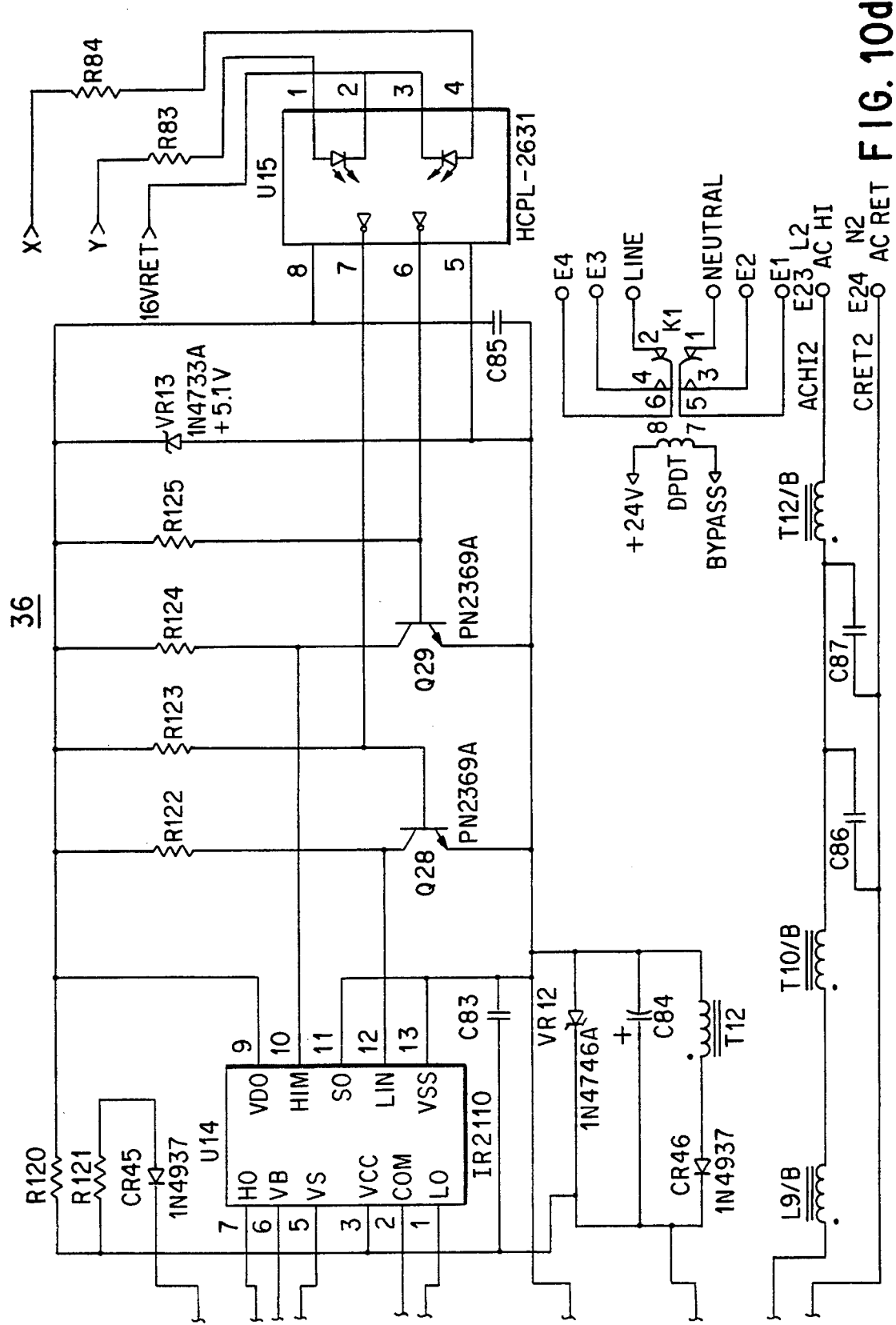

Driver circuit 36, as illustrated in FIGS. 10c and 10d, functions in the same manner as driver circuit 34. The driver signals 150 alternately turn-on transistors Q28, Q29 which input to driver chip U14 to alternately gate Q22 and Q23, resulting in power consisting of a series of width modulated pulses to the output inductor L9 and filter capacitors C86 and C87. L9, C75, and C76 combine to form an output filter that integrates out the high frequency components to produce a sinusodial output signal at output terminals L2 and N2. Another winding in current transformer T10 in the L2 output leg adds to the current feedback signal for the current error amplifier 58. Likewise, another winding of current transformer T12 also in the L2 output leg completes the current feedback signal for the total current IOUT2.

Figure 9A:
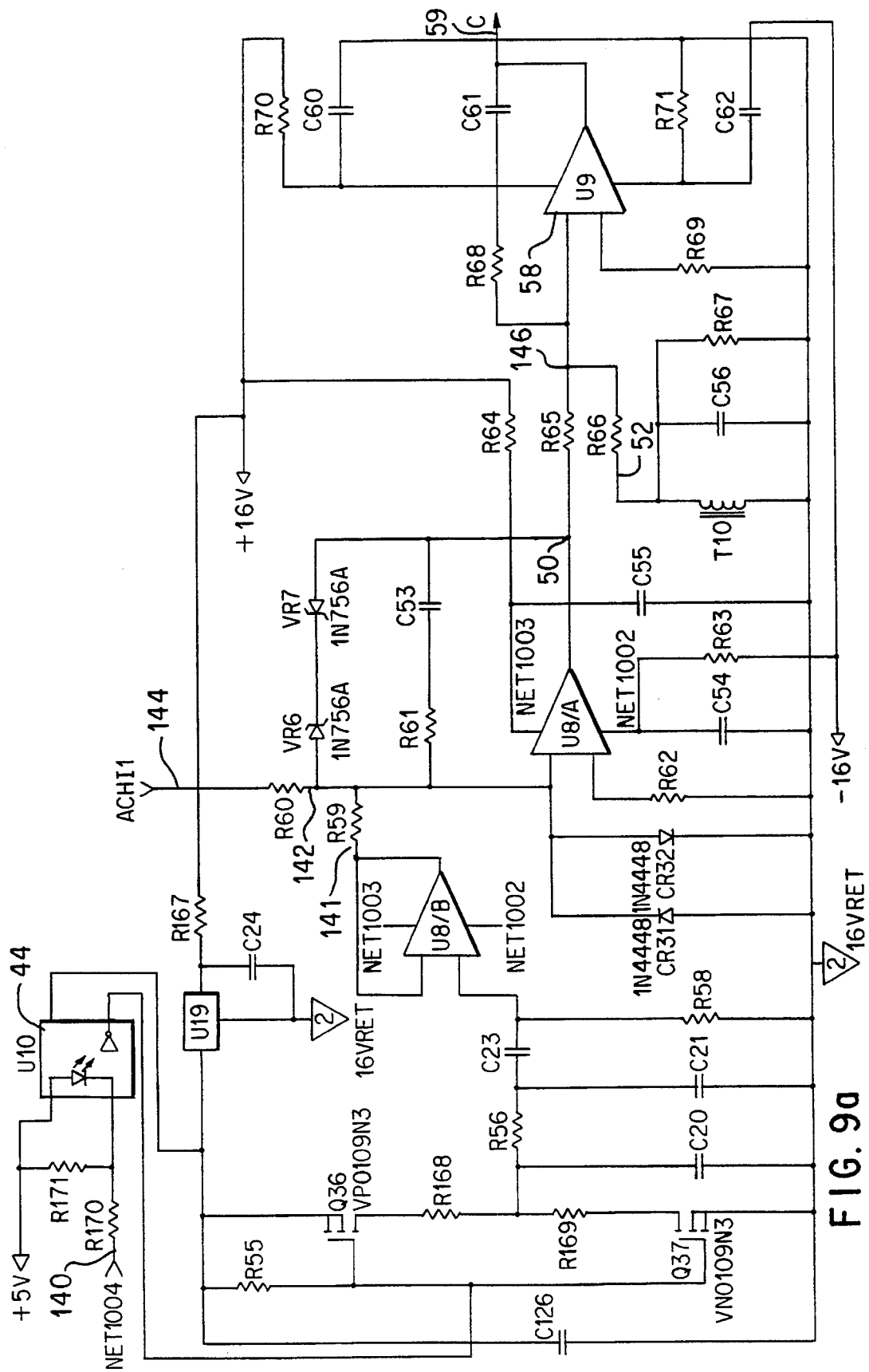
FIGS. 9a and 9b are circuit diagrams of the second DC-AC inverter utilizing a pulse width modulator circuit with voltage and current feedback signals to regulate the AC output voltage and current as depicted in FIG. 1.
Figure 9B:
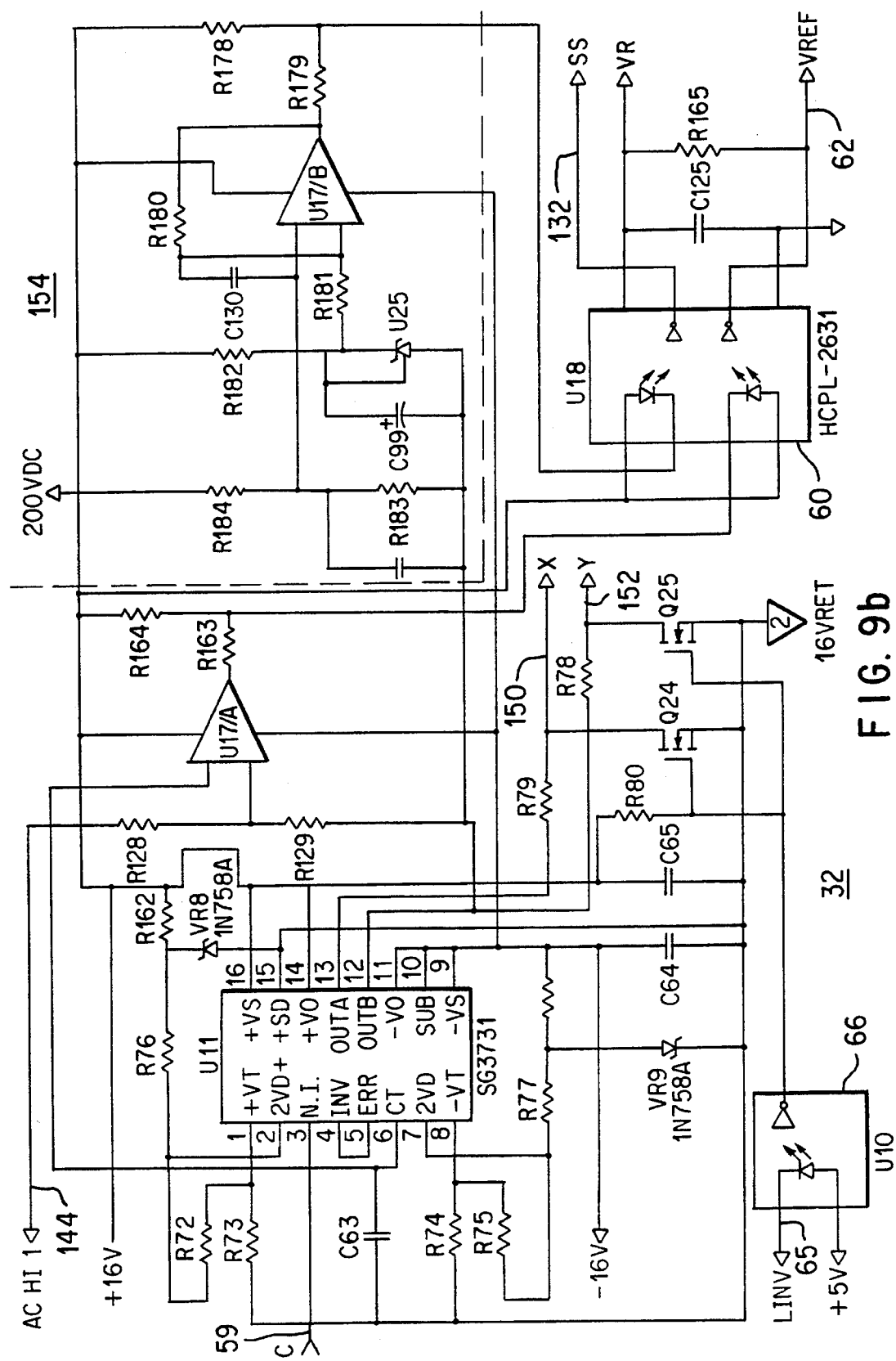

The AC line L1 signal 144 is attenuated by voltage divider resistors R128 and R129 and converted to a PWM signal by comparitor U17/A. The output of U17/A, coupled and isolated by optoisolator 60 becomes the VREF signal 62 which becomes the voltage output reference signal monitored by CPU 14. Circuit 154, as shown in FIG. 9b, is an overvoltage detector with hysteresis that shuts down the PWM chopper circuit 26 if the positive and negative 200 VDC bus becomes too high. This signal is coupled and isolated by optoisolator 60 to gate the SS signal 132 used to provide the soft start input for the PWM chopper circuit 26 previously described.

Figures 11A, 11B:
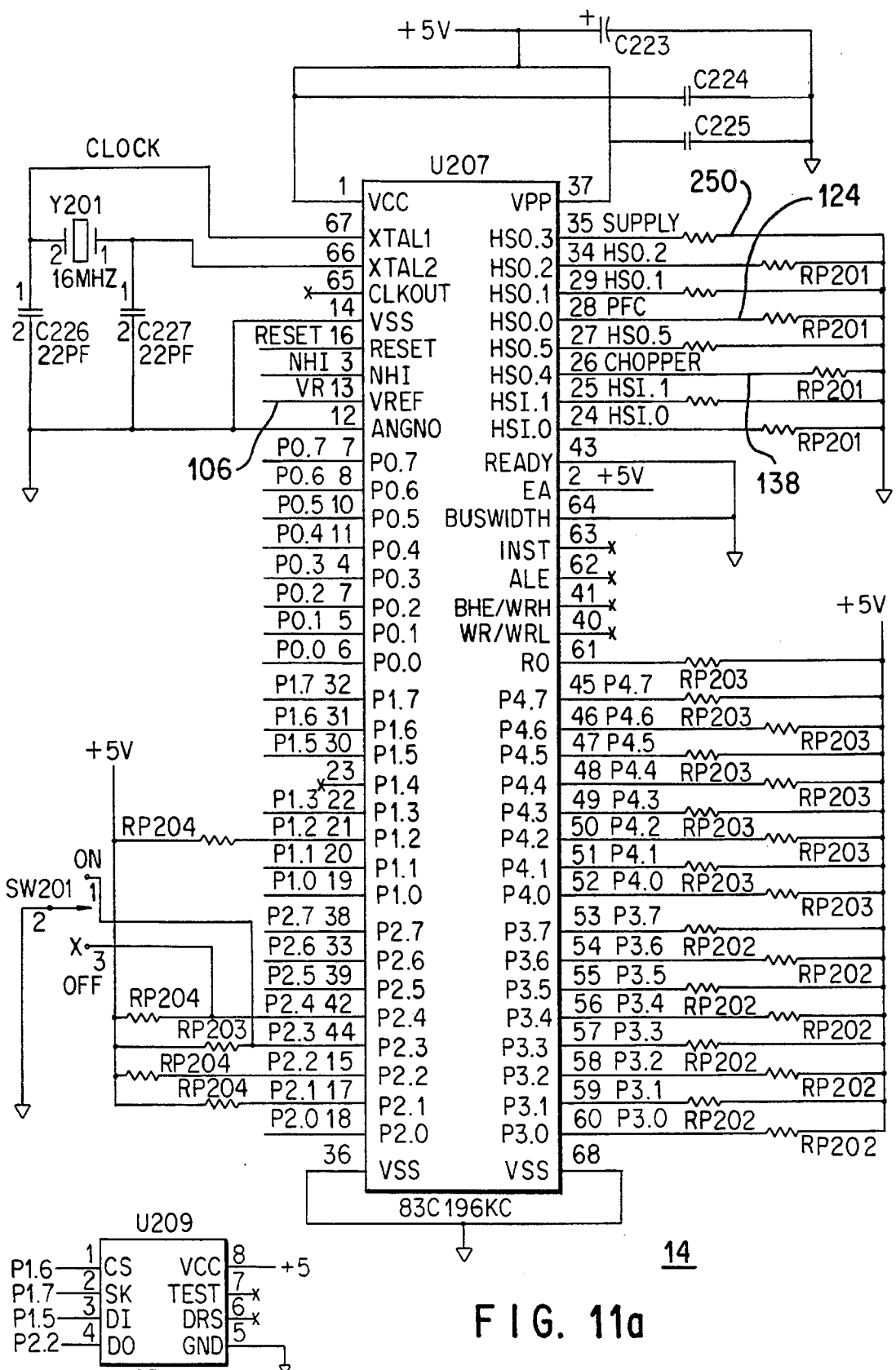
FIGS. 11a and 11b circuit diagrams of the microprocessor (CPU) and associated circuitry depicted in FIG. 1.
Figure 12B:
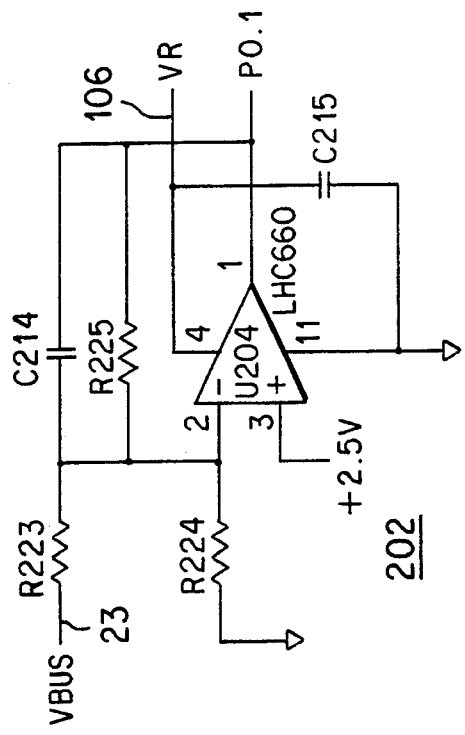
Figure 12D:
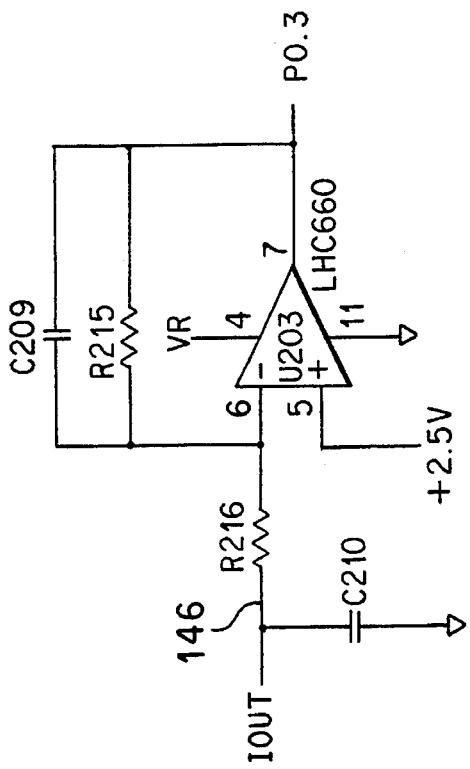
Figure 12A:
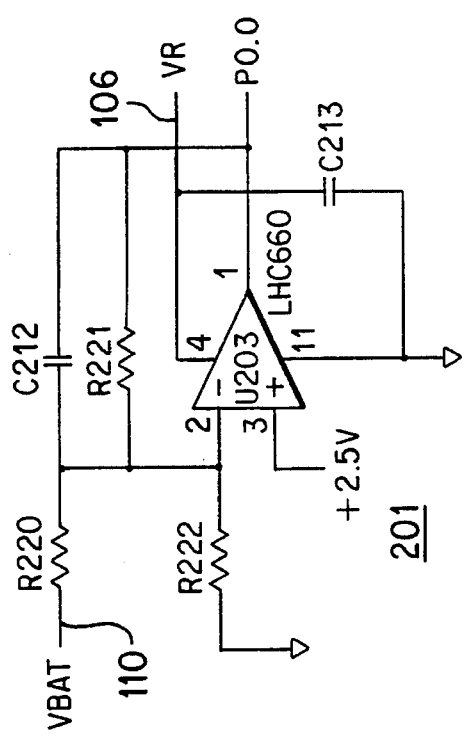
Figure 12C:
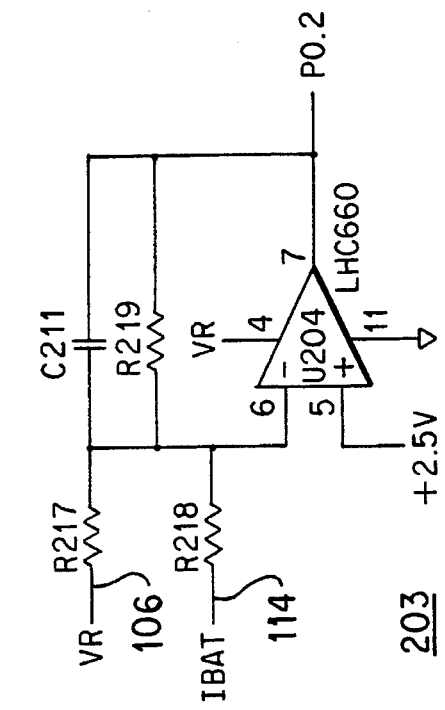
Figure 13A:
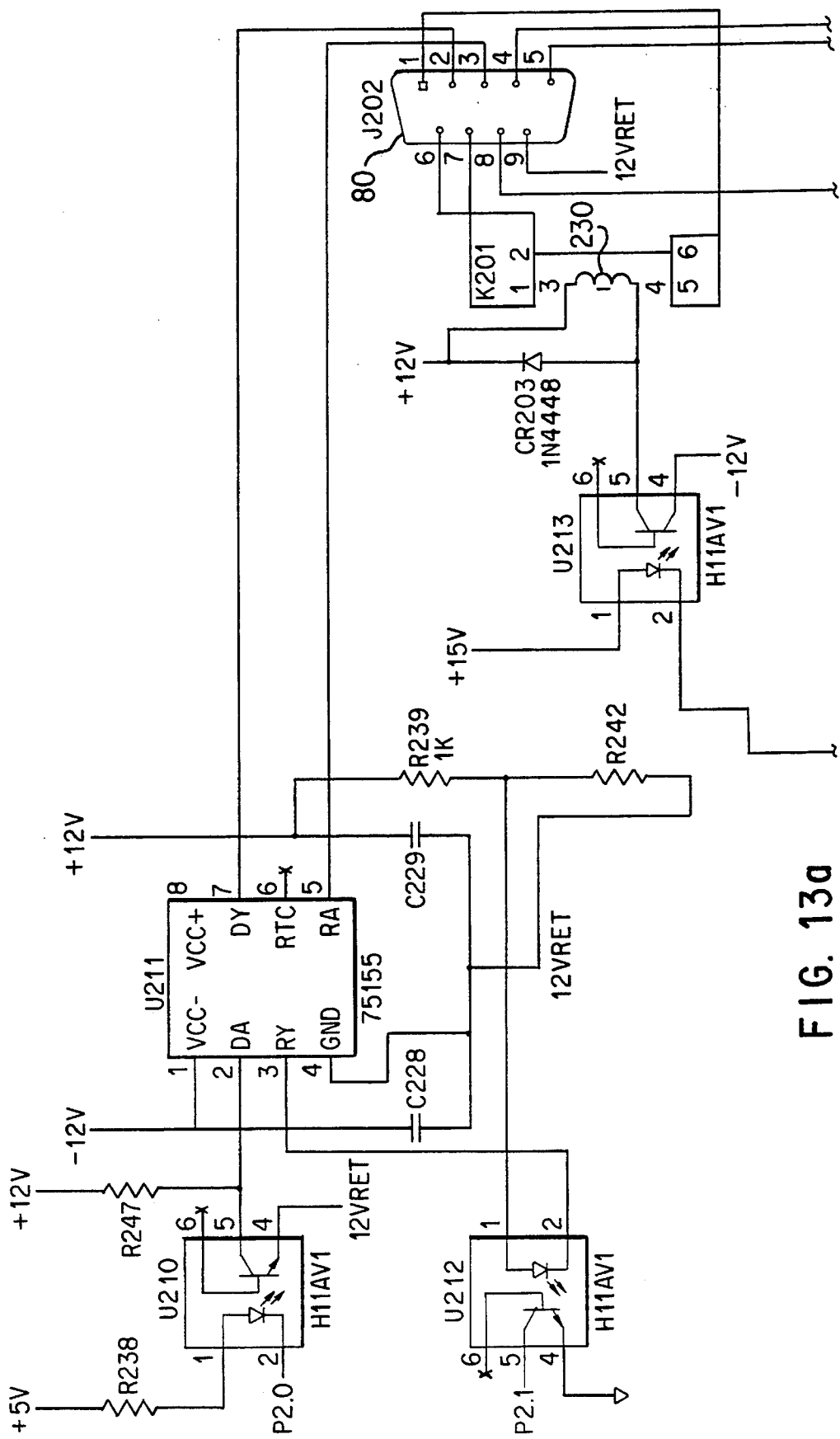
Figure 14A:
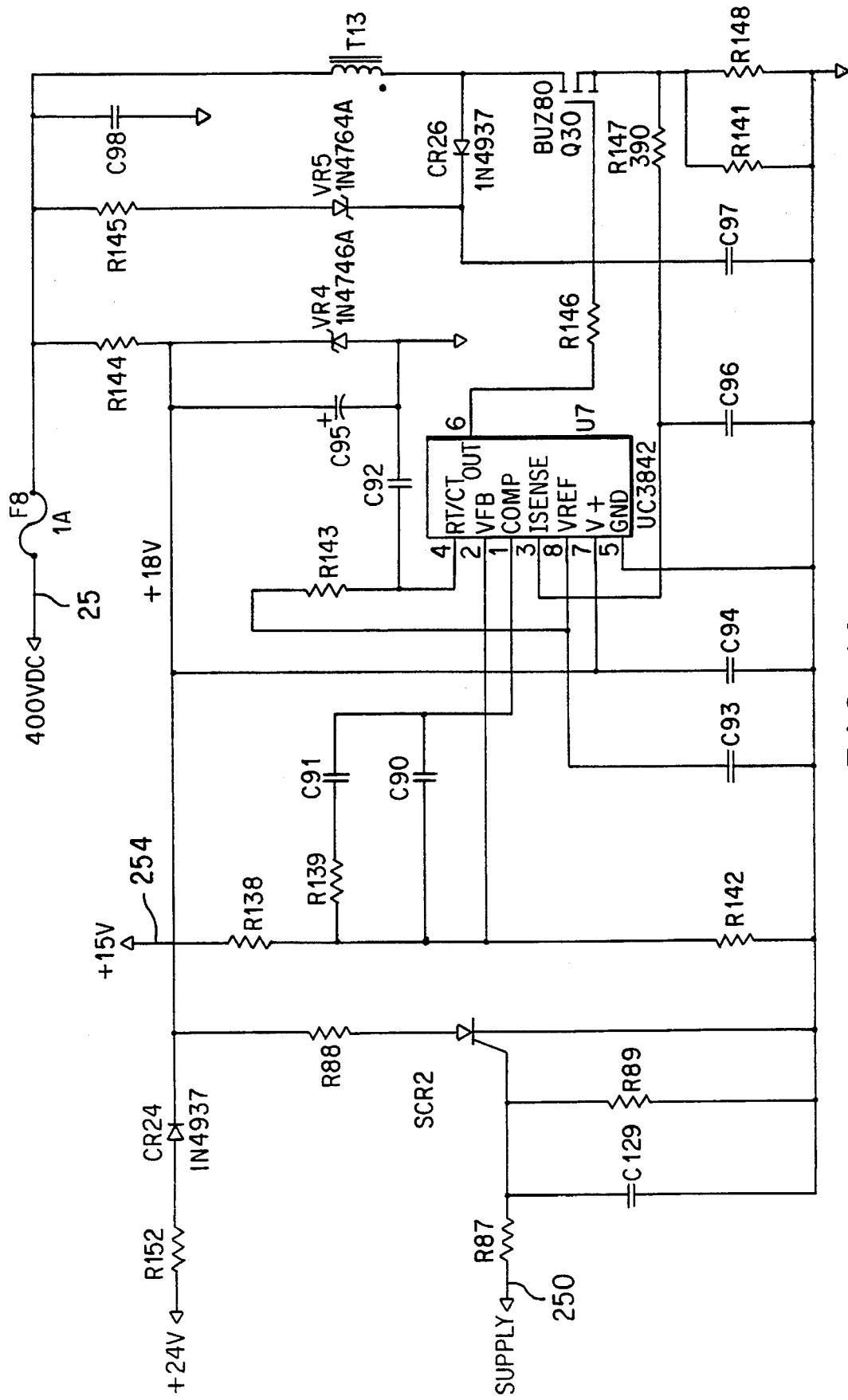
Figure 14D:
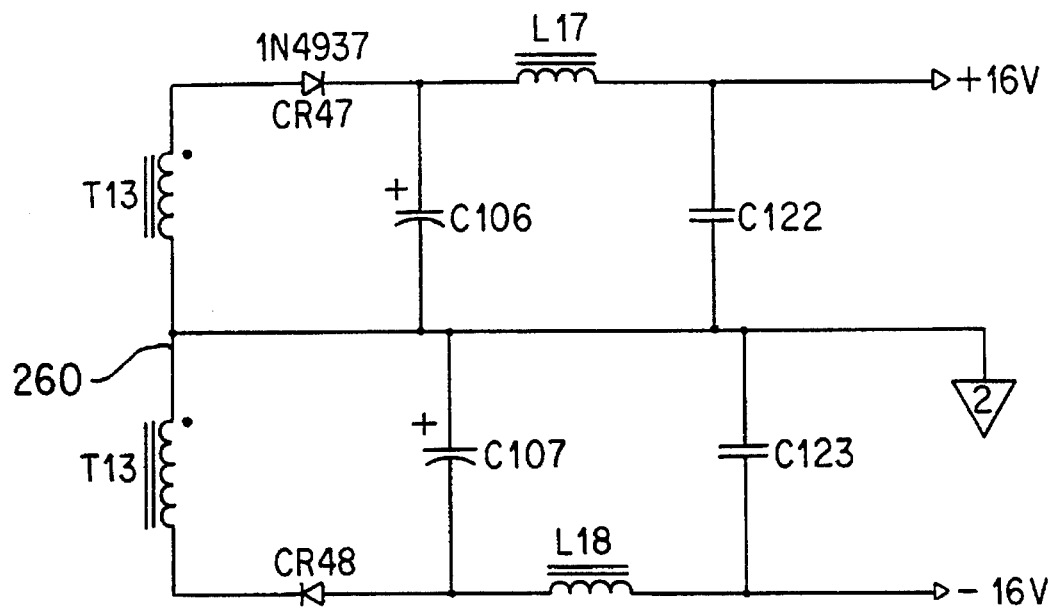
Figure 14E:
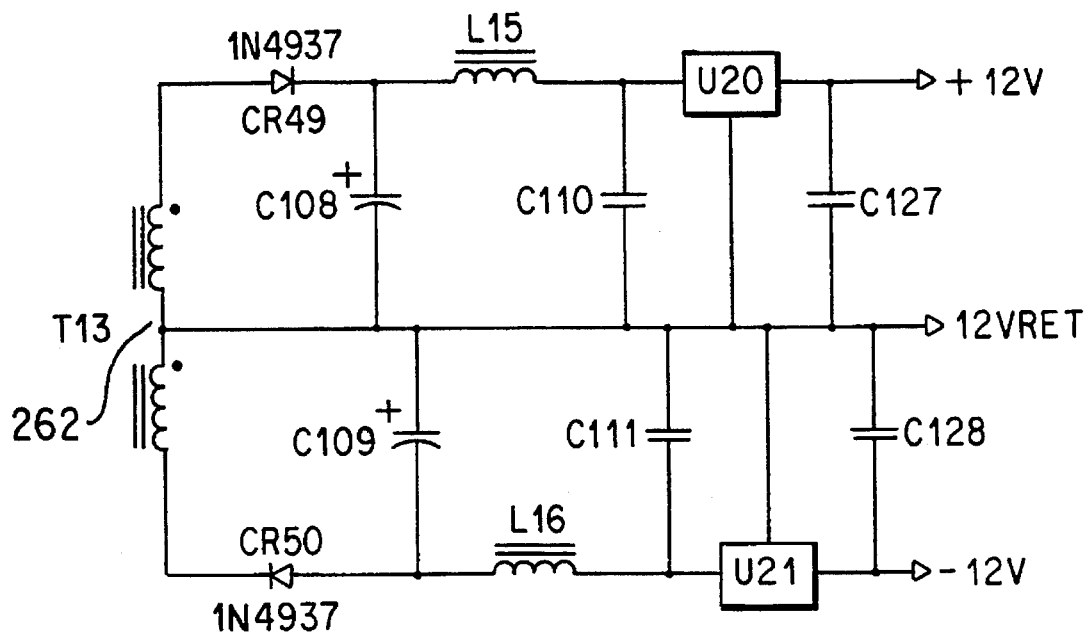

FIGS. 11a and 11d detail the connections to the CPU 14. The clock frequency is controlled by crystal Y201 and is set for 16 MHz. Resistor networks RP201–RP204 provide pull-up and pull-down functions for the input/output points. EEPROM U209 provides storage capabilities for settings, various data and AC line conditions and other operating conditions that might be otherwise lost when power is removed from the UPS device 1 either intentionally or accidentally. Connections for the input/output points are shown in FIGS. 12 and 13. Switch SW201 provides the means for turning the UPS device 1 on and off. In the on mode, CPU 14 will enable, in sequence, the chopper circuit 26 through the CHOPPER signal 138 at high speed output pin HS0.4, the power factor correction circuit 20 through the PFC signal 124 at high speed output pin HS0.0, and the output PWM inverter 32 through the LINV signal 65. In the off mode, CPU 14 will energize the bypass relay 72.

Referring now to FIGS. 12a, 12b, 12c, 12d, 12e, 12f, 12g and 12h buffer circuits 201–208 provide the necessary voltage level shifting to allow conversion of the high voltage AC and DC signals to levels more suitable for CPU 14. Accordingly, a +2.5 VDC offset voltage is utilized as the positive input to the buffer circuits 201–208 to allow the AC signals prevalent in the UPS device 1 to exist in the positive voltage domain, with the zero crossings occurring at 2.5 VDC instead of at ground potential. This provides greater noise immunity and eliminates the need for positive and negative voltage supplies. The +5 VDC reference voltage VR signal 106 is used by CPU 14 as the upper voltage limit for use in the internal A/D converter and is inputted at pin 13.

In buffer circuit 201, VBAT signal 110 from the voltage divider circuit 108, is scaled by resistor R220, offset br resistor R222 and applied as an input to the non-inverting input pin 2 of U203. Feedback capacitor C212 provides noise filtering. The output at pin 1 is feed to an analog to digital conversion input pin P0.0 of CPU 14 and is proportional to the actual voltage level of battery 16. Buffer circuits 202–207 are structured in a similar manner with the corresponding resistors and capacitors providing the same functions. The A/D input pins P0.0–P0.7 provide an internal conversion of the analog signals to digital representations for use by the CPU 14. VBUS signal 23 is buffered by amplifier 202 and inputted to CPU 14 at A/D input pin P0.1 of CPU 14 to provide status information on the 400 VDC bus 25. IBAT signal 114 is buffered by amplifier 203 and inputted to CPU 14 at A/D input pin P0.2 of CPU 14 to provide information on the charging rate of the battery 16. The secondary winding of current transformer T12 provides the total AC output current IOUT2 146 referenced to the 2.5 VDC bias voltage and coupled to buffer amplifier 204. The output of buffer amplifier 204 becomes an input to CPU 14 at A/D input pin P0.3. The attenuated AC input voltage VIN signal 103 is inputted to pin P0.6 of CPU 14 through buffer amplifier 206. VIN 103 provides CPU 14 with the zero crossing information for use in synchronizing the phase relationship of the AC input line 2 with the AC outputs L1-N1 and L2-N2.

Buffer amplifiers 205 and 207 convert the resistance changes of temperature sensors 210, 212 respectively to voltages proportional to temperature. The ambient temperature surrounding the UPS device 1 is inputted to CPU 14 at pin P0.4 through amplifier 205. The temperature of the heatsink on which the output and other power transistors are mounted is inputted to CPU 14 at pin P0.7 through amplifier 207. These temperature readings are used by CPU 14 to protect the output transistors from thermal damage due to overheating if they operating outside their safe operating region or are approaching it. Since ambient temperature does have an effect on the storage capabilities of batteries, the charging current is modified based on this reading.

The AC output voltage is feedback to the system by signal VREF 62. Schmidt trigger inverter U205 produces a square wave output that is filtered by resistors R249 and R251 and capacitors C230–231 to provide an AC output voltage to buffer amplifier circuit 208. The output of buffer amplifier circuit 208 is coupled to input pin P0.5 of CPU 14 to provide the phase and amplitude information of the AC output voltage for use in the various signal processing requirements of the complete UPS system.

Referring now to FIGS. 13a, 13b, 13c and 13d, the output circuitry from CPU 14 is further detailed. Multi-driver chip U216, coupled to high speed outputs HS0.1, HS0.2, and HS0.7 of CPU 14 provides CPU 14 with the compatibly to energize the bypass relay 72 through BYPASS signal 222 and the boost relay 12 through BOOSTRLY signal 125. SCR 18 which initially connects the battery 12 to the power factor correction circuits 20, is turned on by gate signal BBOOST 126. The sine reference signal 42 outputted at pin P1.3 of CPU 14 is coupled to the input of Schmidt trigger inverter 224 to produce a square wave output NET1004 signal 140 that is used to provide the AC output frequency and amplitude regulation as provided by voltage error amplifier 46. CHARGE signal 112 which controls the charge rate of battery charger circuit 70, is outputted at pin P2.5 of CPU 14 and buffered by Schmidt trigger inverter 226. LINV signal line 65 which is used to disable the output PWM inverter 32 is outputted at pin P2.7 and buffered by amplifier 228.

Communication capabilities outside of the UPS device 1 is via output pin P2.0 of CPU 14 for sending serial data and input pin P2.1 for receiving serial data. Isolation of the two data lines is provided by optoisolators 84 and 86. Communication integrated circuit packages for interfacing devices are readily available. Although the I/O command circuit 82 illustrates a RS-232 controller U211, such as a Texas Instruments type 75155, other interfaces such as RS-422 are possible and the preferred embodiment is therefore not to be restricted to that standard. The output of U211 is coupled to connector J202 which provides the means for connecting UPS device 1 to the outside world. Serial data out from the UPS device 1 is located at Pin 2 of J202 which is connected to pin 7 of interface U211. Serial data in is received at pin 3 of J202, which is connected to pin 5 of interface U211. The communication circuits are supplied with a positive and negative 12 VDC power source that is isolated from the rest of the UPS device 1 circuitry. 12VRET provides the return path for the communication signals. Information that could be exchanged over this communication link can be used for monitoring of the input and output AC voltage and current, battery condition, status of the device itself, changing operating setpoints, and so on and is essentially limited only by the application programs. Various established communication protocols can be adaptable for use in the system.

In those cases where a complex communication network is not required, UPS device 1 has a simpler means to provide an indication of its status. Relays K201 and K202 provide relay contacts that are also coupled to connector J202 and which could be used to energize other relays, light indicator lamps, or trigger other types of annunciators. Relay K201 is energized when there is an impending shutdown of the UPS device 1 due to low battery conditions. CPU 14 accomplishes this through multi-driver chip U216 and isolator chip U213. The N.O. contacts 230 of K201 are connected to pins 5 and 7 of connector J202 and could be used as a means to alert that the UPS system can no longer function, allowing time for computers and other devices to have an orderly shutdown. At the time of shutdown, relay K202 will be energized by CPU 14 through multi-driver chip U216 and isolator chip U214. The N.O./N.C. contacts 2320 of K201 are connected to pins 4, 5 and 7 of connector J202. Thus UPS device 1 has a means for communicating with other intelligent devices either through an RS-232 interface or through contact closures.

The various operating voltages are produced by the power supply 27 as detailed in FIGS. 14a, 14b, 14c, 14d and 14e. CPU 14 provides a shutdown signal SUPPLY 250 in the event of a malfunction. Multi-winding transformer T13 provides isolation between the various DC voltages. The 400 VDC bus 25 is the source for all DC voltages in the UPS device 1. Standard switching regulator techniques are used for regulating and producing these voltages and will therefore not be described in detail. The 400 VDC bus 25 is coupled to one side of the primary winding of T13 and regulator U7 controls the operation of power transistor Q30 which switches the other side of the primary winding. Secondary winding 252 of T13 along with diode CR29, output inductor L13, and filter capacitors C101 and C104 produce +15 VDC 254 which is regulated by U7 to become the basis for regulating all the other voltages. 15 VDC 254 is feedback to pin 2 of regulator U7 through resistor R138. Regulator U201 and dropping resistor R201 combine to reduce the 15 VDC 254 to produce +5 VDC 256 that is required for the majority of circuits in the UPS device 1. 15 VDC 254 also is reduced by a separate resistor R202 and shunt regulator diodes U202 and U215 to produce another +5 VDC. This +5 VDC becomes the voltage VR 106 used for the upper reference level for the A/D circuits of CPU 14. The junction of zener diodes U202 and U215 produces the +2.5 VDC which is the DC offset voltage previously described in those circuits of FIGS. 12a, 12b, 12c, 12d, 12e, 12f, 12g and 12h. Secondary winding 258 of transformer T13 produces the +24 VDC that is used for the relays, biasing circuits and cooling fan. Secondary center-tapped windings 260 of transformer T13 produces the isolated positive and negative 16 VDC biasing required in the AC output inverter circuits of PWM 32 and output drive circuits 34, 36. The isolated communication circuits receive its power from the secondary center-tapped windings 262 of transformer T13 which produces the 12 VDC voltages in conjunction with regulators U20 and U21.

UPS device 1 provides self checking diagnostics during start-up and run. Upon energization, CPU 14 will enable the chopper circuit 26 through CHOPPER signal 138 and if it functions properly, will enable the power factor correction circuits 20 through PFC signal 124. The output inverter PWM 32 will then be started by LINV signal 65. If any of these are not functioning with limits, CPU 14 will disable the output inverter PWM 32 and energize the bypass relay 72. CPU 14 also provides signals that could be used to illuminate LEDs to indicate the charge existing in the battery 16. A red LED could indicate a weak battery, a yellow LED could be used for charging, and a green LED could show that the battery is fully charged.

While the specific embodiments have been illustrated and described, numerous modifications are possible without departing from the scope or spirit of the invention. Modifications of the embodiment can be made as desired by varying the values of the illustrated components or using alternative and equivalent integrated circuit devices to effect the same procedures.

I claim:

1. An improved uninterruptible power supply for supplying a load with AC electrical output power from an AC input source when said AC input source is within settable voltage limits, and supplying said load with AC electrical output power from a DC auxiliary power source when said AC input source is outside said voltage limits, said improved uninterruptible power supply comprising:

A. means for monitoring said AC input source to determine frequency and amplitude of said AC input source;
   B. means for converting said AC input source to a first DC voltage;
   C. means for transferring between said AC input source and said DC auxiliary power source to select an input source of said AC electrical output power, said input source being said first DC voltage when the amplitude of said AC input source is within said voltage limits and said DC auxiliary power source when the amplitude of said AC input source is outside said voltage limits;
   D. means for providing active power factor correction of said AC input source when said AC input source is said input source;
   E. means for boosting and regulating said input source to produce a second and higher DC voltage;
   F. means for converting said second DC voltage to produce equal and commonly grounded positive and negative DC voltages;
   G. means for inverting said positive and negative DC voltages to produce said AC electrical output power;
   H. means for generating a signal proportional to an average AC electrical output current of said AC; electrical output power to provide an average current feedback loop to said inverting means:
   I. means for regulating said AC electrical output power to a voltage amplitude corresponding to said determined frequency;
   J. means for limiting said AC electrical output power to a current level within settable current limits to prevent failure of said inverting means; and
   K. means for maintaining a voltage phase relationship between said AC input power and said AC output power during said transferring between said AC input power source and said DC auxiliary power source.

2. The improved uninterruptible power supply of claim 1 in which said conversion means of said AC input source to a first DC voltage is a bridge rectifier and further includes means for filtering said AC input source to remove electromagnetic and radio interference.

3. The improved uninterruptible power supply of claim 1 in which said transferring means includes a means for isolating said AC input source from said DC auxiliary power source when said DC auxiliary power source is the source of said AC electrical output power.

4. The improved uninterruptible power supply of claim 1 in which said conversion means of said second DC voltage to produce equal and commonly grounded positive and negative DC voltages includes a chopper circuit for producing pulse width modulated (PWM) driver signals to control conduction of a four quadrant driver circuit, said four quadrant driver circuit to provide controlled switching of said second DC voltage to produce an equivalent AC sinusoidal voltage at a frequency substantially higher than said determined frequency of said AC input source.

5. The equivalent AC sinusoidal voltage of claim 4 further coupled to the primary of an isolation transformer to produce said positive and negative DC voltages by rectifying means of center-tapped secondaries of said isolation transformer.

6. The improved uninterruptible power supply of claim 1 in which said inverting means of said positive and negative DC voltages includes a PWM inverter to produce said AC electrical output power, said PWM inverter including means for comparing the voltage amplitude of said AC electrical output power to the voltage amplitude corresponding to said determined frequency to produce a voltage error signal, means for comparing said signal proportional to average AC electrical output current with said voltage error signal to produce a current error signal, said current error signal for modulating the width of pulses used to control conduction of output driver circuits in said inverting means.

7. The improved uninterruptible power supply of claim 6 in which said PWM inverter further includes means for limiting the magnitude of said voltage error signal, said limiting means to further limit the current error signal and thus, limit the width of the pulses used to control conduction of said output driver circuits and limit the AC electrical output power to a current level below that level that could cause failure of said output driver circuits.

8. The improved uninterruptible power supply of claim 1 further including means for comparing the voltage phase relationship of said AC input power source with said AC electrical output power to produce a voltage reference signal, said voltage reference signal for controlling operation of said means for inverting said positive and negative DC voltages to produce said AC electrical output power in voltage phase synchronization with said AC input power source.

9. The improved uninterruptible power supply of claim 1 wherein said DC auxiliary power source is a battery.

10. The improved uninterruptible power supply of claim 9 including means for monitoring the voltage level of said battery and means for charging said battery to maintain a full electrical charge on said battery when said AC input source has been selected as the source of said AC electrical output power, said charging means for charging said battery at one rate when said battery is not fully charged and at a lower rate when said battery is near full charge.

11. The improved uninterruptible power supply of claim 1 further including a microprocessor, said microprocessor providing voltage and current monitoring functions of said AC input power source, said DC auxiliary power source, and said AC electrical output power, said monitoring functions controlling operation of said uninterruptible power supply.

12. The microprocessor of claim 11 further including means for monitoring temperature rises of output driver circuits used in said inverting means to produce said AC electrical output power, said temperature monitoring means preventing operation of said uninterruptible power supply when said temperature rises could result in failure of said output driver circuits.

13. The microprocessor of claim 11 further functioning as said monitoring means of said AC input source to determine frequency of said AC input source and including means for generating a voltage reference signal in phase with and of the same frequency as said AC input source, said voltage reference signal to maintain said AC electrical output power at the same frequency as said AC input source when said DC auxiliary power source is the source of said AC electrical output power.

14. The improved uninterruptible power supply of claim 1 further including means for connection to a serial communication network, said connection for sending and receiving data over said network.

15. The improved uninterruptible power supply of claim 14 wherein said data sent over said network includes signals indicative of the status of said uninterruptible power supply.

16. The improved uninterruptible power supply of claim 14 wherein said data received over said network includes signals means for controlling operation of said uninterruptible power supply.

17. In an uninterruptible power supply for supplying a load with AC electrical output power, a method for generating said AC electrical output power from an AC input source when said AC input source is within settable voltage limits and for generating said AC electrical output power from a DC auxiliary power source when said AC input source is outside said voltage limits, said method comprising:

A. monitoring said AC input source to determine frequency and amplitude of said AC input source;

B. converting said AC input source to a first DC voltage;

C. transferring between said AC input source and said DC auxiliary power source to select an input source of said AC electrical output power, said input source being said first DC voltage when the amplitude of said AC input source is within said voltage limits and said DC auxiliary power source when the amplitude of said AC input source is outside said voltage limits;

D. providing active power factor correction of said AC input source when said AC input source is said input source;

E. boosting and regulating said input source to produce a second and higher DC voltage;

F. converting said second DC voltage to produce equal and commonly grounded positive and negative DC voltages;

G. inverting said positive and negative DC voltages to produce said AC electrical output power;

H. generating a signal proportional to an average AC output current of said AC electrical output power to provide an average current feedback loop for regulating said AC electrical output power to a voltage amplitude corresponding to said determined frequency;

I. limiting said AC electrical output power to a current level within settable current limits to prevent failure of said inverting means; and J. maintaining a voltage phase relationship between said AC input power and said AC output power during said transferring between said AC input power source and said DC auxiliary power source and vice versa to prevent voltage and current transients at the time of said transferring.

18. The method of claim 17 wherein said DC auxiliary power source is a battery, said method further including monitoring the voltage level of said battery and charging said battery to maintain a full electrical charge on said battery when said AC input source has been selected as the source of said AC electrical output power, said charging of said battery at one rate when said battery is not fully charged and at a lower rate when said battery is near full charge.

19. The method of claim 17 further including exchanging data over a serial data communications network wherein said data sent over said network includes signals indicative of the status of said uninterruptible power supply and said data received over said network includes signals for controlling operation of said uninterruptible power supply.

20. The method of claim 17 wherein said uninterruptible power supply includes a microprocessor for sequencing operation of said uninterruptible power supply.

21. The method of claim 20 wherein said microprocessor performs said monitoring of said AC input source to determine frequency and amplitude of said AC input source, provides control signals to allow said transferring between said AC input source and said DC auxiliary power source as the source of said AC electrical output power based on said determined amplitude, and generates a sine reference signal for said maintaining of said voltage phase relationship between said AC input power and said AC output power based on said determined frequency.

* * * * *